US010423227B2

United States Patent
Gu

(10) Patent No.: US 10,423,227 B2
(45) Date of Patent: Sep. 24, 2019

(54) HAND EXOSKELETON FORCE FEEDBACK SYSTEM

(71) Applicant: Dexta Robotics, Nanjing (CN)

(72) Inventor: Xiaochi Gu, Nanjing (CN)

(*) Notice: Subject to any disclaimer, the term of this patent is extended or adjusted under 35 U.S.C. 154(b) by 0 days.

(21) Appl. No.: 15/155,220

(22) Filed: May 16, 2016

(65) Prior Publication Data

US 2016/0259417 A1    Sep. 8, 2016

Related U.S. Application Data

(63) Continuation-in-part of application No. 14/459,594, filed on Aug. 14, 2014, now Pat. No. 9,342,151.

(30) Foreign Application Priority Data

Jul. 21, 2014    (CN) .......................... 2014 1 0346346

(51) Int. Cl.
   *G08B 6/00*       (2006.01)
   *G06F 3/01*       (2006.01)
   *G06T 19/00*      (2011.01)

(52) U.S. Cl.
   CPC .............. *G06F 3/016* (2013.01); *G06F 3/014* (2013.01); *G06T 19/006* (2013.01); *G08B 6/00* (2013.01)

(58) Field of Classification Search
   CPC .......... G06F 3/016; G06F 3/014; G06F 3/017; G06T 19/006; G08B 6/00
   USPC ...................................................... 340/407.1
   See application file for complete search history.

(56) References Cited

U.S. PATENT DOCUMENTS

| 5,912,658 | A | 6/1999 | Bergamasco |
| 6,042,555 | A * | 3/2000 | Kramer .................. A61B 5/225 600/595 |
| 7,138,976 | B1 | 11/2006 | Bouzit |
| 7,862,522 | B1 | 1/2011 | Barclay |
| 9,084,690 | B2 * | 7/2015 | Pedersen ................. A61F 5/013 |
| 9,652,037 | B2 * | 5/2017 | Rubin ..................... G06F 3/013 |
| 2003/0223844 | A1 * | 12/2003 | Schiele ............... A61H 1/0274 414/5 |
| 2006/0267932 | A1 * | 11/2006 | Rosenberg .............. A63F 13/06 345/156 |
| 2008/0300521 | A1 * | 12/2008 | Karkanias ................. A61F 5/01 602/2 |
| 2009/0048539 | A1 * | 2/2009 | Lundborg ............... A61F 2/583 600/595 |

(Continued)

FOREIGN PATENT DOCUMENTS

| EP | 2345951 | 7/2011 |
| WO | 2012081402 | 6/2012 |

OTHER PUBLICATIONS

Control VR: downloaded on Dec. 18, 2014 from http://www.controlvr.com; prior art as of at least Aug. 13, 2014.

(Continued)

*Primary Examiner* — Hai Phan
*Assistant Examiner* — Anthony D Afrifa-Kyei

(57) ABSTRACT

This disclosure includes a force feedback device. The force feedback device may include an exoskeleton configured to receive a hand of a user, a base, a force feedback unit, and a microcontroller. The force feedback unit may be coupled to the base of the exoskeleton and the microcontroller. In some embodiments, the force feedback unit is a direct drive motor system.

17 Claims, 20 Drawing Sheets

(56) References Cited

U.S. PATENT DOCUMENTS

| | | | | |
|---|---|---|---|---|
| 2010/0041521 A1* | 2/2010 | Ingvast | ............... | A61H 1/0288 |
| | | | | 482/49 |
| 2010/0134327 A1* | 6/2010 | Dinh | ....................... | G06F 3/014 |
| | | | | 341/20 |
| 2011/0282253 A1* | 11/2011 | Menon | ................... | B25J 9/0006 |
| | | | | 601/40 |
| 2012/0025945 A1 | 2/2012 | Yazadi | | |
| 2013/0278500 A1 | 10/2013 | Kawasaki | | |
| 2014/0077929 A1* | 3/2014 | Dumas | ............... | G07C 9/00571 |
| | | | | 340/5.61 |
| 2014/0232646 A1* | 8/2014 | Biggs | ...................... | G06F 3/016 |
| | | | | 345/156 |
| 2015/0351935 A1* | 12/2015 | Donati | ................... | A61F 2/586 |
| | | | | 623/25 |
| 2016/0278947 A1* | 9/2016 | Martin | ...................... | A61F 2/68 |

OTHER PUBLICATIONS

Leap Motion: downloaded on Dec. 18, 2014 from https://www.leapmotion.com/product, prior art as of at least Aug. 13, 2014.

Cyberglove II data sheet: downloaded on Dec. 18, 2014 from http://www.cyberglovesystems.com/products/cyberglove-II/overview, prior art as of at least Aug. 13, 2014.

Cyberglove III data sheet: downloaded on Dec. 18, 2014 from http://www.cyberglovesystems.com/products/cyberglove-III/overview, prior art as of at least Aug. 13, 2014.

* cited by examiner

HAND EXOSKELETON FORCE FEEDBACK SYSTEM

CROSS-REFERENCE TO RELATED APPLICATIONS

This application claims the benefit of and is a continuation-in-part of U.S. patent application Ser. No. 14/459,594; filed Aug. 14, 2014; and entitled HAND MOTION-CAPTURING DEVICE WITH FORCE FEEDBACK SYSTEM. The entire contents of U.S. patent application Ser. No. 14/459,594 are incorporated herein by reference. U.S. patent application Ser. No. 14/459,594 claims the benefit of Chinese Patent Application Serial No. 201410346346.7; filed Jul. 21, 2014; and entitled A HAND MOTION-CAPTURING DEVICE WITH A FORCE FEEDBACK SYSTEM USING A MECHANICAL APPROACH. The entire contents of Chinese Patent Application Serial No. 201410346346.7 are incorporated herein by reference.

BACKGROUND

Field

Various embodiments disclosed herein relate to an implementation for a force feedback method of an exoskeleton system, with applications in augment reality or virtual reality and robot control.

Description of Related Art

There are currently a number of hand-motion capturing solutions. Some existing solutions use camera and computer vision technologies to analyze the shape and direction of a hand. Three hand-motion-capturing approaches use optical capturing, IMU (inertia measurement unit) capturing and bending sensor (i.e. Flex sensors) capturing.

Among devices that use the optical capturing approach, a device called the "Leap Motion Controller", from Leap Motion, Inc., uses an infrared camera to track motion of hands and utilizes algorithms to fuse data from the camera. However, some disadvantages are commonly seen in devices that use computer vision to track the motion of the hand. The ability of these devices to track hand motion is restricted due to the camera's limited monitoring scope and direction. These devices are not capable of generating a correct hand model when a user's hand is out of the camera's monitoring scope. Furthermore, an optical-capturing-based solution is unable to offer force feedback without incorporating an additional wearable device.

Another device called the "Control VR", from Control VR, uses IMU to measure the offset angle of each finger. A disadvantage of the IMU device is the need to recalibrate the zero-offset each time the device is placed in a new magnetic environment, and that it loses accurate tracking when placed in a strong magnetic field. Additionally, because this approach involves installing drivers on the back of the user's hand, implementing force feedback is more difficult. Moreover, this approach uses bending sensors, such as a strain gauge, installed on a glove to capture hand motion. However, this approach is not able to accurately provide measurements because of the non-linear relationship between sensor readings and bending of finger. As well, it is difficult to implement force-feedback with this approach due to similar reasons as with the IMU approach. Bending sensors based approach, similar to the IMU approach, is unable to offer exact coordinates to describe finger positions due to their principles of measurements.

Early attempts to implement haptic interfaces for human hands include the PHANTOM, which measures users' hand position with a grounded robotic arm and exerts controlled point force vector on users' hand. PHANTOM achieved precise stiffness control by adjusting the torque of three DC brushed motors with encoders. This technology is essentially a transmission between the motors and the human hand. Therefore the workspace for the user and the mobility is highly limited. Moreover, this system fails to produce feedback for individual fingers, reducing the credibility of the haptic experience. The Rutgers Master II ND utilizes pneumatic actuators arranged in center of palm and achieves force feedback by directly driving the fingers. This device uses the non-contact Hall effect and IR sensors for motion capturing for durability reasons, yet this approach raises manufacture costs. Specifications of the RMII-ND haptic glove are comparable to those of the CyberGrasp, another well-known haptic glove system. CyberGrasp uses resistive bend sensors for motion capturing. This system uses a DC motor and cable-pulley transmissions on an exoskeleton to pull users' finger backward in order to simulate the exerted force. Primarily intended for corporations, such as military and medical rehabilitation, CyberGrasp system is not a consumer-grade product. While these two systems are capable of offering precise force control, they are large in size and expansive due to the complexity of the design. Other systems include Haptic Telexistence, HIRO III (Japanese robotics system) and RML Glove.

SUMMARY

Several embodiments can include a hand motion-capturing device with a force feedback system. The device includes a base, a microcontroller connected to the base, and a thumb sensor module and four-finger sensor modules each electrically connected to the microcontroller. The device also includes five link rods. Each of the five link rods interconnects the thumb sensor module to the base and each of the four-finger sensor modules to the base. The device also includes a thumb force feedback system adapted and configured to receive a human thumb. The thumb force feedback system is movably connected to the link rod and the thumb sensor module. As well, the device includes a four-finger force feedback system adapted and configured to receive an index finger, a middle finger, a ring finger, and a little finger, wherein the four-finger force feedback system is movably connected to the link rod and the four-finger sensor modules.

Several embodiments can include two different force feedback implementations of a motion capturing hand exoskeleton. These two implementations for the force feedback unit each include a motor, a mechanical transmission system, a microcontroller and a rotation sensor.

Each hand exoskeleton system may use five force feedback unit. The thumb force feedback system is movably connected to the link rod and the thumb sensor module. As well, the exoskeleton system includes a four-finger force feedback system adapted and configured to receive an index finger, a middle finger, a ring finger, and a little finger, wherein the four-finger force feedback system is movably connected to the link rod and the four-finger sensor modules.

Several embodiments can include a force feedback device with a force feedback system. The force feedback device with a force feedback system includes: an exoskeleton configured to receive a hand of a user, a base, a force feedback unit, and a microcontroller. Wherein the force feedback unit is coupled to the base of the exoskeleton and the microcontroller.

Some embodiments may include one or more of the following. The force feedback unit may be mechanically coupled to the base. The force feedback unit may be electronically coupled to the microcontroller. The force feedback unit may be a first force feedback unit, and the force feedback device may further comprise a second force feedback unit, a third force feedback unit, a fourth force feedback unit, and a fifth force feedback unit. Each of the first force feedback unit, second force feedback unit, third force feedback unit, fourth force feedback unit, and fifth force feedback unit correspond to the five fingers of a hand. The force feedback unit may be mechanically coupled to the base with a bar. The force feedback device may be configured to capture hand motion. The exoskeleton may be a motion capturing device. The exoskeleton may be configured to interface with a motion capturing device.

Several embodiments may include one or more of the following. The force feedback device may further comprise at least one finger cap. The force feedback unit may be mechanically coupled to the finger cap. The force feedback unit may be mechanically coupled to the finger cap with a profiled bar. The force feedback device may further comprise a rotation sensor. The microcontroller may be a first microcontroller; and may further comprise a second microcontroller.

Several embodiments may include one or more of the following. The force feedback unit is a side-locking mechanism. The side-locking mechanism may comprise a first profiled gear ring, an upper link bar, a second profiled gear ring, a lower link bar, a linear actuator slider module, a first profiled anti-shaped-gear, a second profiled anti-shaped-gear, and a worm gear. It should be appreciated that the linear actuator slider can be any kind of linear actuator, i.e. a linear solenoid, or a rotational solenoid with a worm gear, which transform its rotational movement into linear movement. Wherein the first profiled gear ring may be mechanically coupled to the upper link bar. The second profiled gear ring may be mechanically coupled to the lower link bar. The first profiled anti-shaped-gear may be coupled to the linear actuator slider module and the second profiled anti-shaped-gear may be coupled to the linear actuator slider module via the worm gear. The first profiled gear ring may be configured to mesh with the first profiled anti-shaped-gear and the second profiled gear ring may be configured to mesh with the second anti-shaped-gear. The first profiled gear ring and the second profiled gear ring are identical. The linear actuator slider module comprises a motor and a transmission gear box. The force feedback unit is a direct drive motor system. The force feedback device may further comprise a torque output arm. The microcontroller may be configured to regulate torque output of the direct drive motor system. The direct drive motor system may be a servo motor. The direct drive motor system may be configured to act as an electronic spring.

In some embodiments, the exoskeleton is adjustable to fit different hand sizes. As well, in some embodiments, the system includes an output arm cap that is adjustable to fit different finger lengths and hand sizes. The exoskeleton can also include at least one of a button and a means of user control whereby the button and the means of user control are configurable to receive input from a user. For example, in some embodiments, the user control includes at least one button, dial, joystick, or other means of "user control".

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Figure 1:
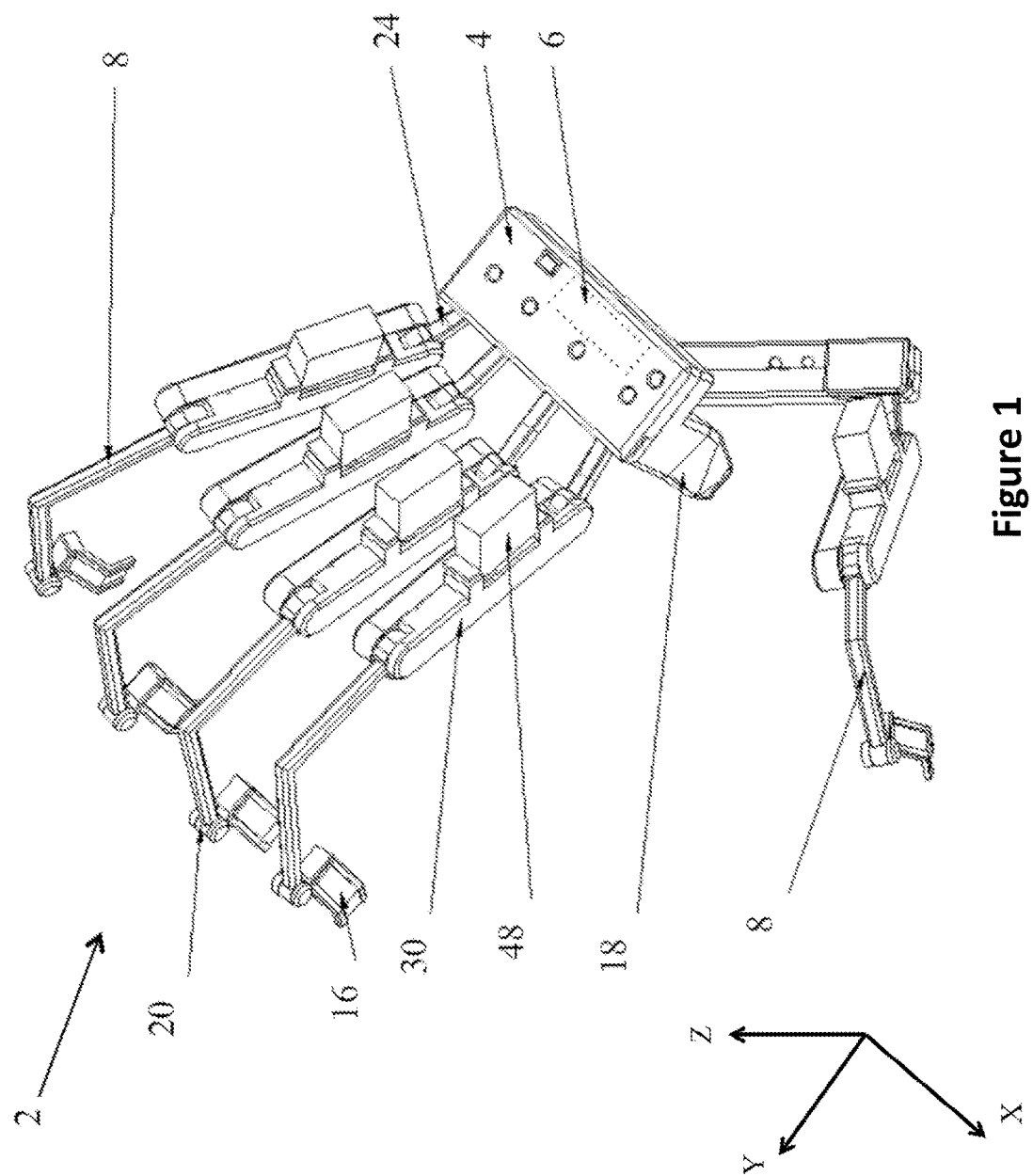
FIG. 1 illustrates a perspective view of a device, according to some embodiments.

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

This disclosure may offer a compact force feedback unit design for portable force feedback. The force feedback systems disclosed herein may be based on the hand motion capturing exoskeleton system disclosed in U.S. patent application Ser. No. 14/459,594, which is incorporated by reference in its entirety. The gesture of the users' hand may be measured and this disclosure may offer a more robust/versatile force feedback. The force feedback experience along with the hand gesture measurements can be used in augmented/virtual reality experience, gaming, robotics control and other mechanical control. The force feedback unit may provide computer-controlled on-and-off rigid force feedback. Some force feedback unit implementations may also provide computer-controlled resistance, to create different levels of springiness, which may effectively simulate the user feeling the object not existing in his or her presence. For example the user can tell the difference between a stone and a balloon purely by squeezing with their fingers. This may greatly improve the sense of immersion.

In some examples, a user may use this device to control a robot to perform a bomb disposal task from one kilometer distance from the bomb's location. The user can remotely control a robot hand to grasp explosives by moving the hand of the user. At the instant that the object is grasped in position, self-locking mechanisms may be signaled to lock the rotation joint in a fixed position in order to generate a feel of grasping, or the force feedback servo will perform position based impedance control to generate a feel of grasping with softness feedback. Previously, this operation may have required multiple cameras to locate the object. However, with this invention, a user may only use one camera and the sense of touch to locate the object. With the use of head-mounted display (such as Oculus Rift, Sony Morpheus, or HTC Vive), users may be more effective in bomb disposal.

In some examples, such as augmented/virtual/mixed reality gaming, users may use a head-mounted display to see both of their hands in a virtual world. When the user tries to grasp a virtual object (virtual object in augmented reality (real life) or virtual reality (virtual world)), software embodiments of this disclosure will analyze the coincidence of a hand model and an object model and signal the force feedback mechanism on the device to simulate computer-controlled force. The locking effect or the impedance controlled motor force feedback may produce pressure on the fingertips of the user. The pressure, in turn, creates a sense of touching that may simulate the sense of grasping an object in the real world. It is even possible for the force feedback to simulate force of different levels, and the sense may offer life-like experience for games and may add to the extension of games. In order to solve the technological problems described above, embodiments described in this disclosure may utilize a hand-motion-capturing device using a mechanical approach and capable of offering force feedback.

In order to solve the technological problems described above, embodiments described in this disclosure may utilize a two different force feedback approaches for a hand-motion-capturing device. By combining with virtual or real time graphics, the device may provide timely force-feedback to users' finger to create higher immersion experiences when installed to a hand-motion-capturing device (see U.S. patent application Ser. No. 14/459,594).

The hand-motion-capturing structures utilizing multiple types of sensors and structures integrated with connecting rods, the device may track the users' precise hand motion. These signals data is then transmitted to a simulated virtual hand controlled by this device for collision detection. Once the virtual hand touches a digital object, the collision signal will be sent back to the device and the replaceable force feedback units. Then the force feedback units activates and exert forces on to users' fingertips via connecting rods and caps.

Currently available methods include the use of string-pulley system, string-ball screw linear actuator system and other components of high cost. Since these solutions require string to transmit force and typically hand motors at the back end, they tend to also have high weight, complex structure and low maintainability.

Because the force feedback unit is mechanically jointed to the users' finger, with the motor and transmission unit enclosed inside the force feedback unit, the force feedback device can be provide much rigid force output while being modular and easily replaceable.

The force feedback system may obstruct the rotation of the rotational joint with resistance by transmitting a profiled gear via an executional element (such as a servo motor, etc.) to push the rack to slide to two sides. In some embodiments, the system may obstruct the rotation by plugging the profiled gear into the ratchet ring wheel of the rotational joint using a linear actuator. In yet some embodiments, the system may use a profiled motor driven servo unit to perform impedance control to directly change the torque output, which may generate a sense of gripping for the user.

This invention may revolutionize how people interact with 3D objects. When using in conjunction with an augmented reality, virtual reality, or mixed reality headset, people could manipulate data and objects in 3D and feel them, this greatly increases immersion as well as precision. Industrial designers can view and move parts of a car model, rocket scientists could explore into their design. The device could also be used to control a robot hand and feel the feedback to improve immersion. For users in the field of art and music, this invention can be used to perform an innovative art form.

With specific reference to FIG. 1, some embodiments of the device 2 may include a base 4, a microcontroller 6 connected to the base 4, a thumb sensor module and four-finger sensor modules each electrically connected to the microcontroller 6. The base 4 may be attached to the back of the hand via a connection element. As well, the microcontroller 6 may be attached to the base 4 and electrically connected to the exoskeleton of the five fingers (the thumb sensor module and the four-finger sensor module). Data may be collected by the microcontroller 6 and transmitted via wires in the finger exoskeletons to the base 4. In this manner, the hand joint can twist without restriction, and thus hand movements may achieve increased flexibility and precision.

The device 2 may also include five link rods 18, whereby each of the five link rods 18 interconnects the thumb sensor module to the base 4 and each of the four-finger sensor modules to the base 4. In some embodiments, the device 2 may include a thumb force feedback system adapted and configured to receive a human thumb. The thumb force feedback system may be movably connected to the link rod 18 and the thumb sensor module. As well, in some embodiments, the device 2 may include a four-finger force feedback system adapted and configured to receive an index finger, a middle finger, a ring finger, and a little finger. The four-finger force feedback system may be movably connected to the link rod 18 and the four-finger sensor modules. It should be appreciated that the fingers may be human fingers, or fingers belonging to any mammal, such as a gorilla.

Figure 2:
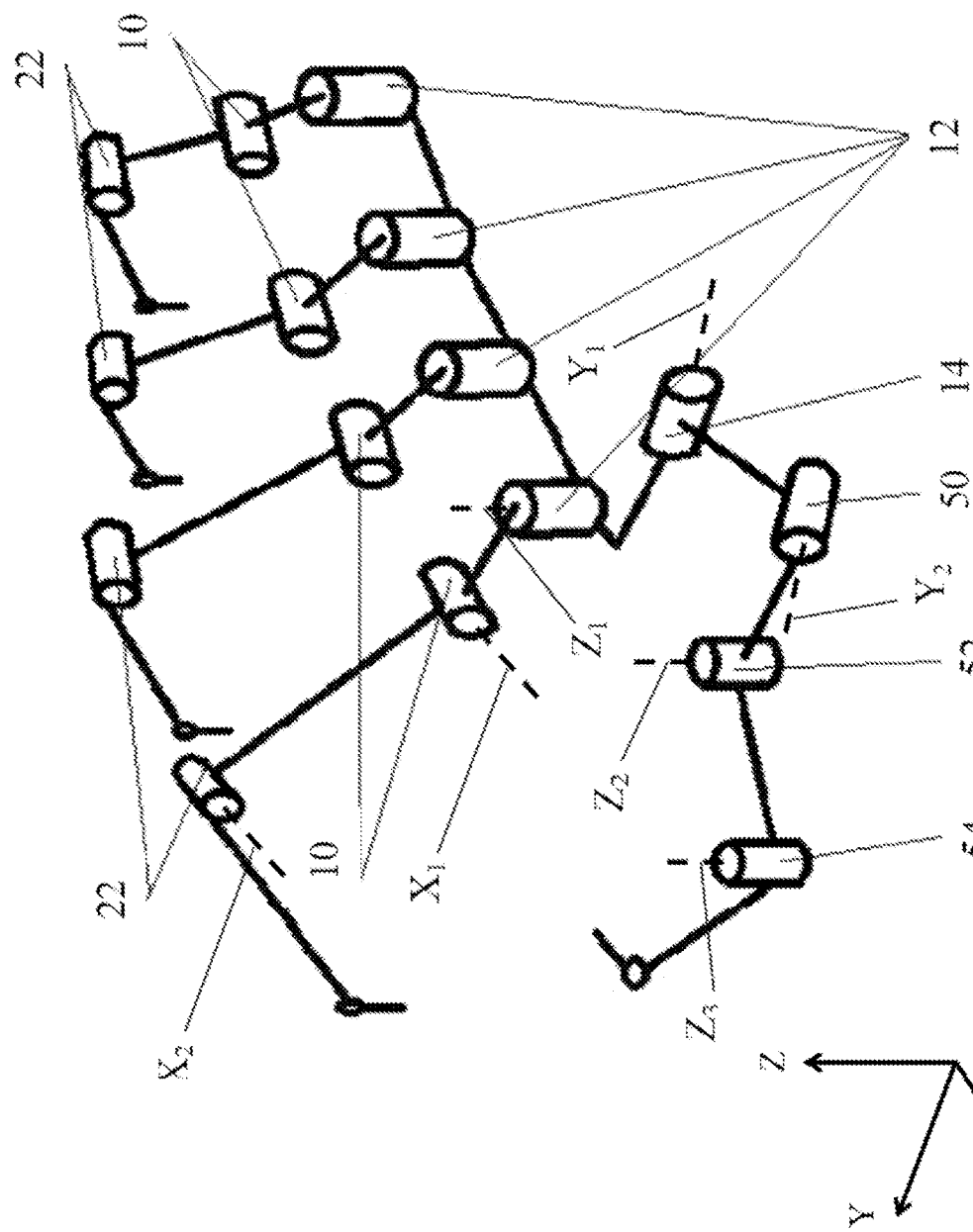
FIG. 2 illustrates a perspective view of a schematic of a device, according to some embodiments.
Figure 3:
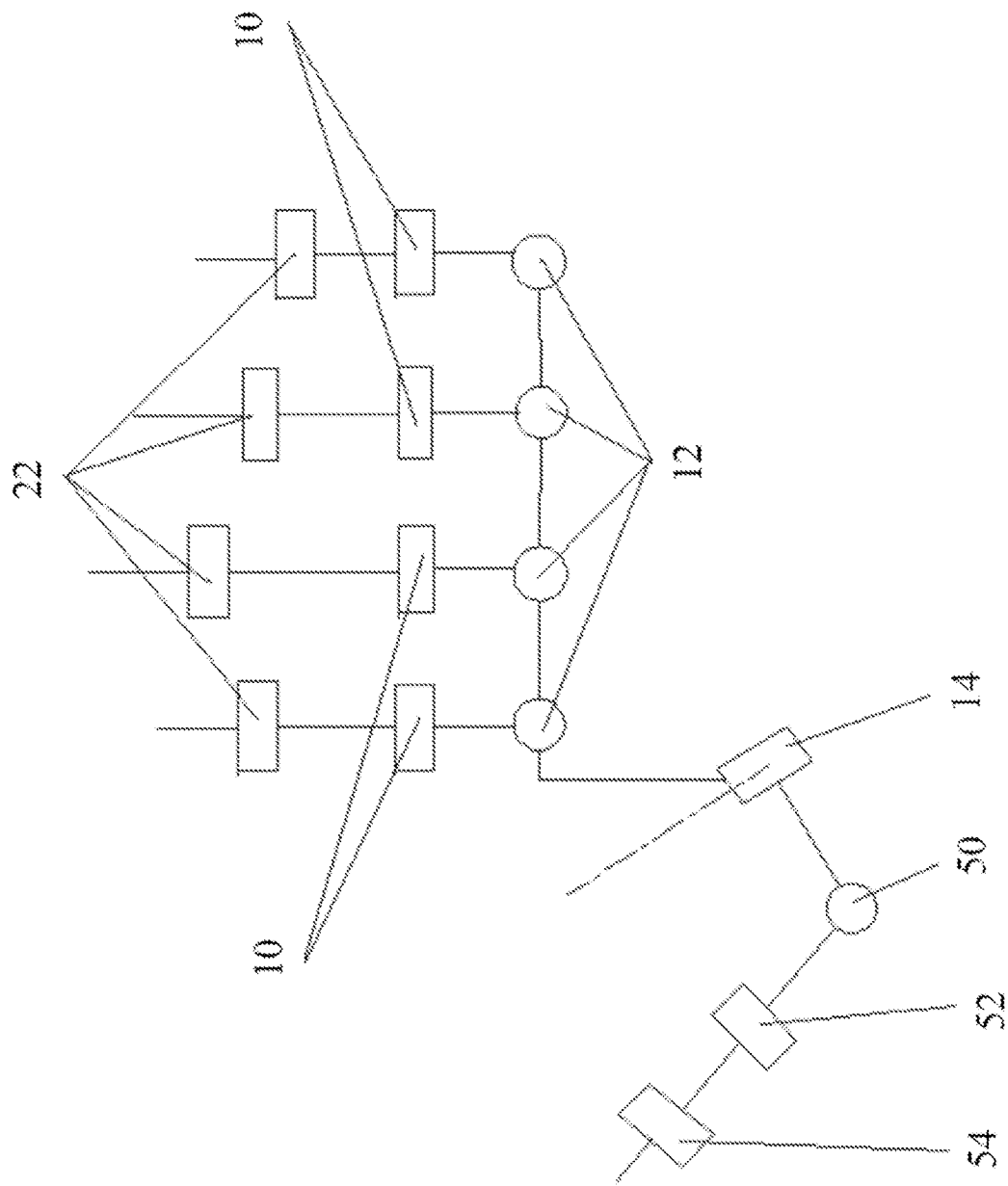
FIG. 3 illustrates a top view of a schematic of a device, according to some embodiments.

As shown in FIGS. 2 and 3, the base 4 may include a bottom plane that extends along a first direction X and a second direction Y that is perpendicular to the first direction X. The four-finger sensor modules may each include four pairs of perpendicularly connected first and second potentiometers 10 and 12. The four second potentiometers 12 may be disposed on the base 4 with the axes $Z_1$ being parallel to a third direction Z that is perpendicular to the first and second directions X and Y, such that they are perpendicular to the bottom plane of the base 4. The system may also include four third potentiometers 22. Each of the third potentiometers 22 may be connected to a first potentiometer 10 through the four-finger force feedback system, and parallel with the first potentiometer's axis $X_1$, which may also parallel with the third direction Z. It should be appreciated that any number of first, second, and/or third potentiometers 22 above or below four, may be used in the system.

With continued reference to FIGS. 2 and 3, the thumb force sensor module may include sequentially connected fourth potentiometer 14, fifth potentiometer 50, and sixth potentiometer 52. The fourth potentiometer's axis $Y_1$ may be parallel to the fifth potentiometer's axis $Y_2$. The sixth potentiometer's axis $Z_2$ may be perpendicular to each of the fourth potentiometer's axis $Y_1$ and the fifth potentiometer's axis $Y_2$. As well, there exists a seventh potentiometer 54 connected with the sixth potentiometer 52 through the thumb force feedback system. Additionally, the seventh potentiometer's axis $Z_3$ may be parallel to the sixth potentiometer's axis $Z_2$. The fourth potentiometer 14 may be connected to the second potentiometer. As well, the fourth potentiometer 14 may be attached to the back side of the base 4. In addition, the fourth potentiometer's axis $X_2$ may intersect with the perpendicular plane in which the four second potentiometer's axes $Z_1$ are located. As well, the fourth potentiometer 14 may be connected with microcontroller 6.

Figure 4:
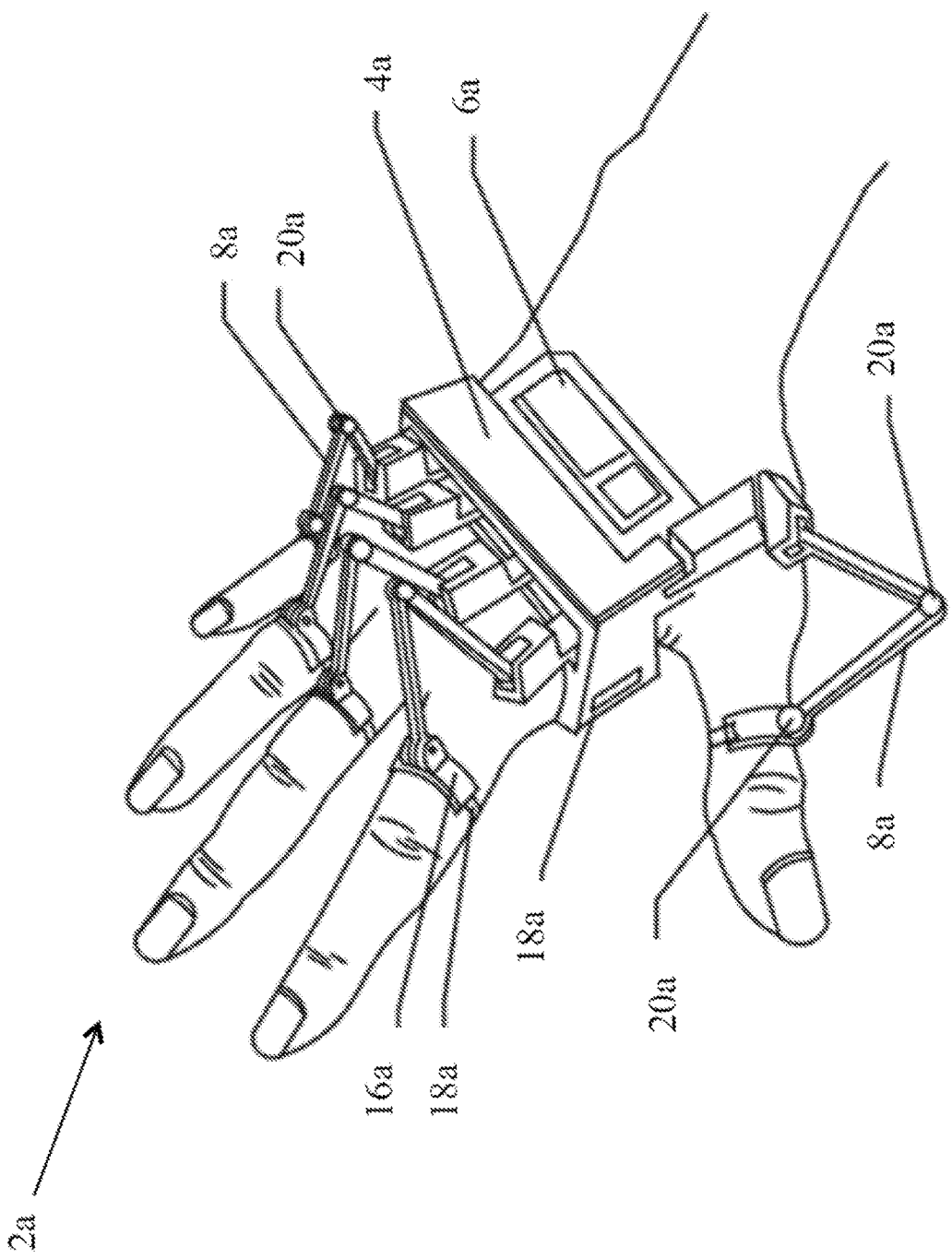
FIG. 4 illustrates a perspective view of another device, according to some embodiments.
Figure 5:
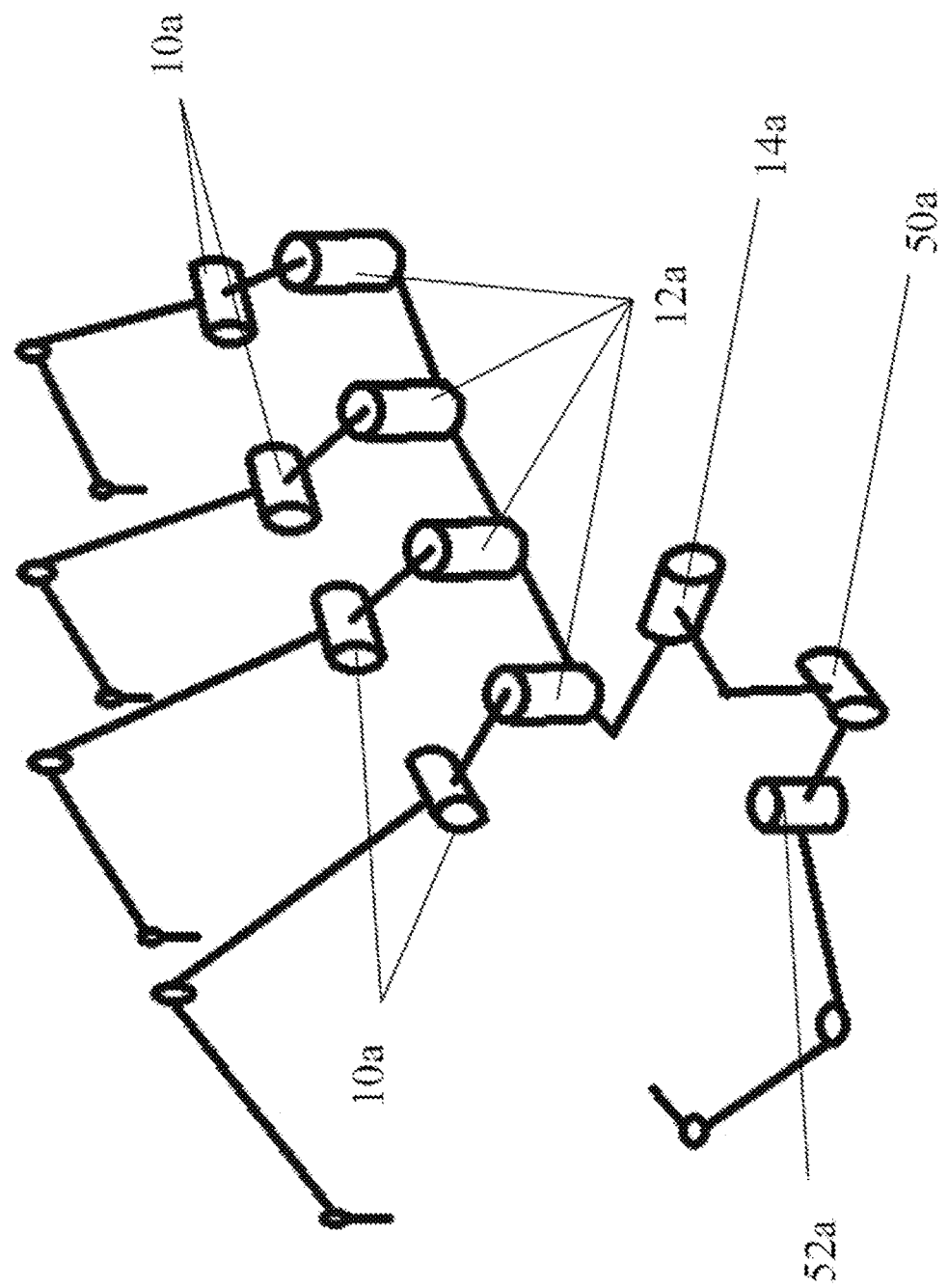
FIG. 5 illustrates a perspective view of a schematic of the device from FIG. 4, according to some embodiments.

FIGS. 4 and 5 illustrate another force feedback device 2a with a force feedback system. The device 2a illustrated in FIGS. 4 and 5 is similar to the device 2 disclosed in FIGS. 1-3; however, the device 2a disclosed in FIGS. 4 and 5 includes 11 potentiometers as opposed to the 16 potentiometers disclosed in device 2 of FIGS. 1-3. Accordingly, the device 2a shown in FIGS. 4 and 5 includes 11 degrees of freedom of movement, as opposed to the device 2 with 16 degrees of freedom of movement from FIGS. 1-3. In this manner, the device 2a of FIGS. 4 and 5 includes four-first potentiometers 10a, four-second potentiometers 12a, a fourth potentiometer 14a, a fifth potentiometer 50a, and a sixth potentiometer 52a.

Furthermore, the device 2a of FIGS. 4 and 5 is structurally similar to the device 2 of FIGS. 1-3, except that device 2a does not include four-third potentiometers 22 and a seventh potentiometer 54. In place of the third and seventh potentiometers 22 and 54, the device includes a hinged joint defined by connection bolts 20a that couple the adjacent profiled linked rods 8a together. Generally, it should be appreciated that the devices disclosed in FIGS. 1-5 are just two examples of the many different variations of devices that can include any number of potentiometers to thereby define any number of degrees of freedom of movement.

Figure 6:
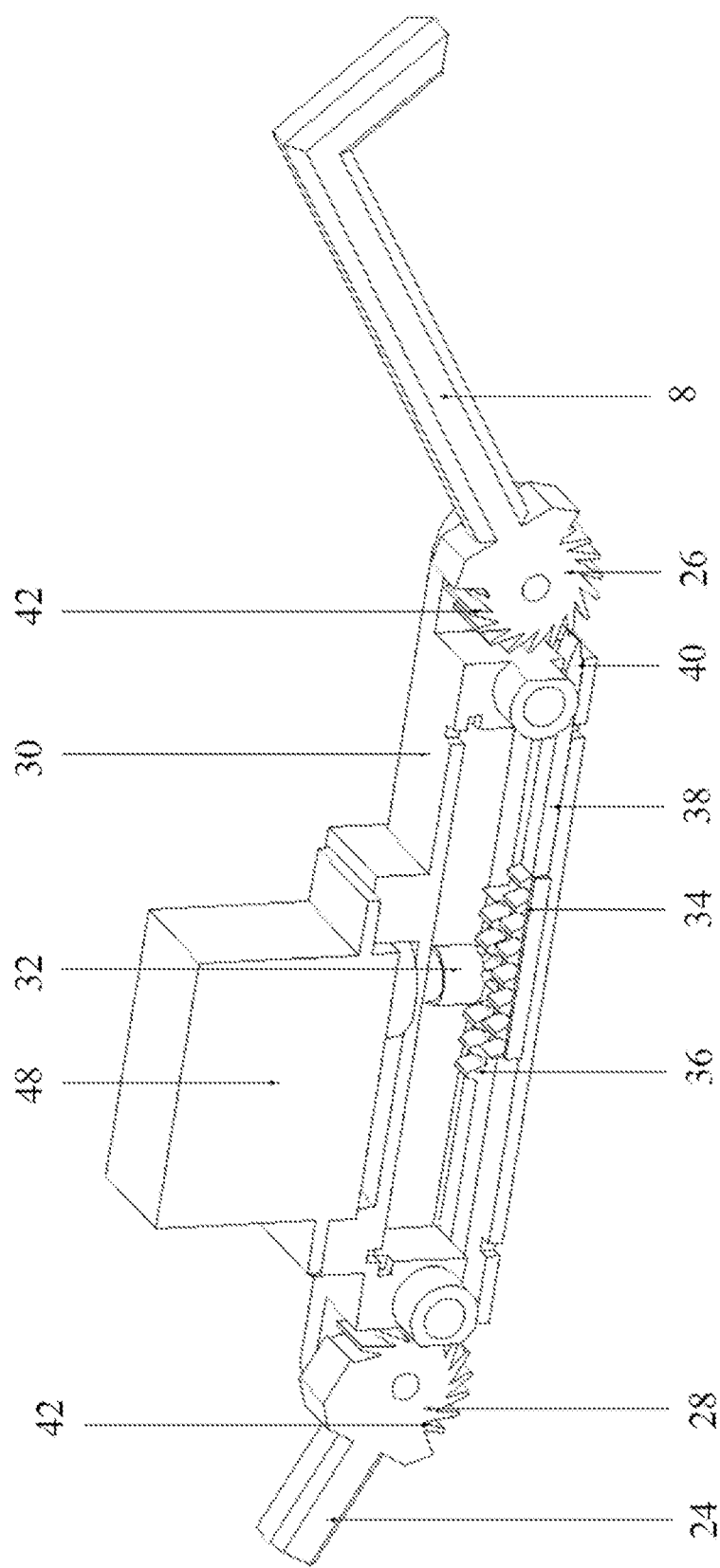
FIG. 6 illustrates a cross-sectional perspective view of a locking mechanism, according to some embodiments.
Figure 7:
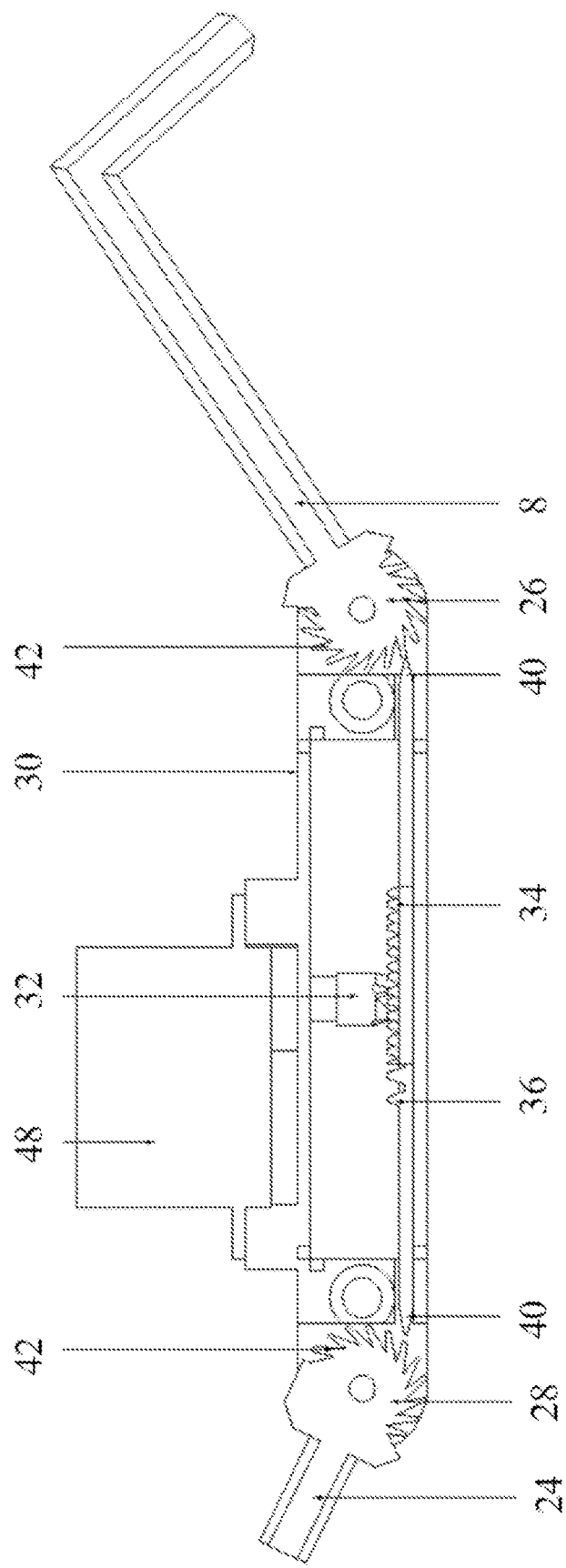
FIG. 7 illustrates a cross-sectional side view of the locking mechanism as shown in FIG. 6, according to some embodiments.
Figure 8:
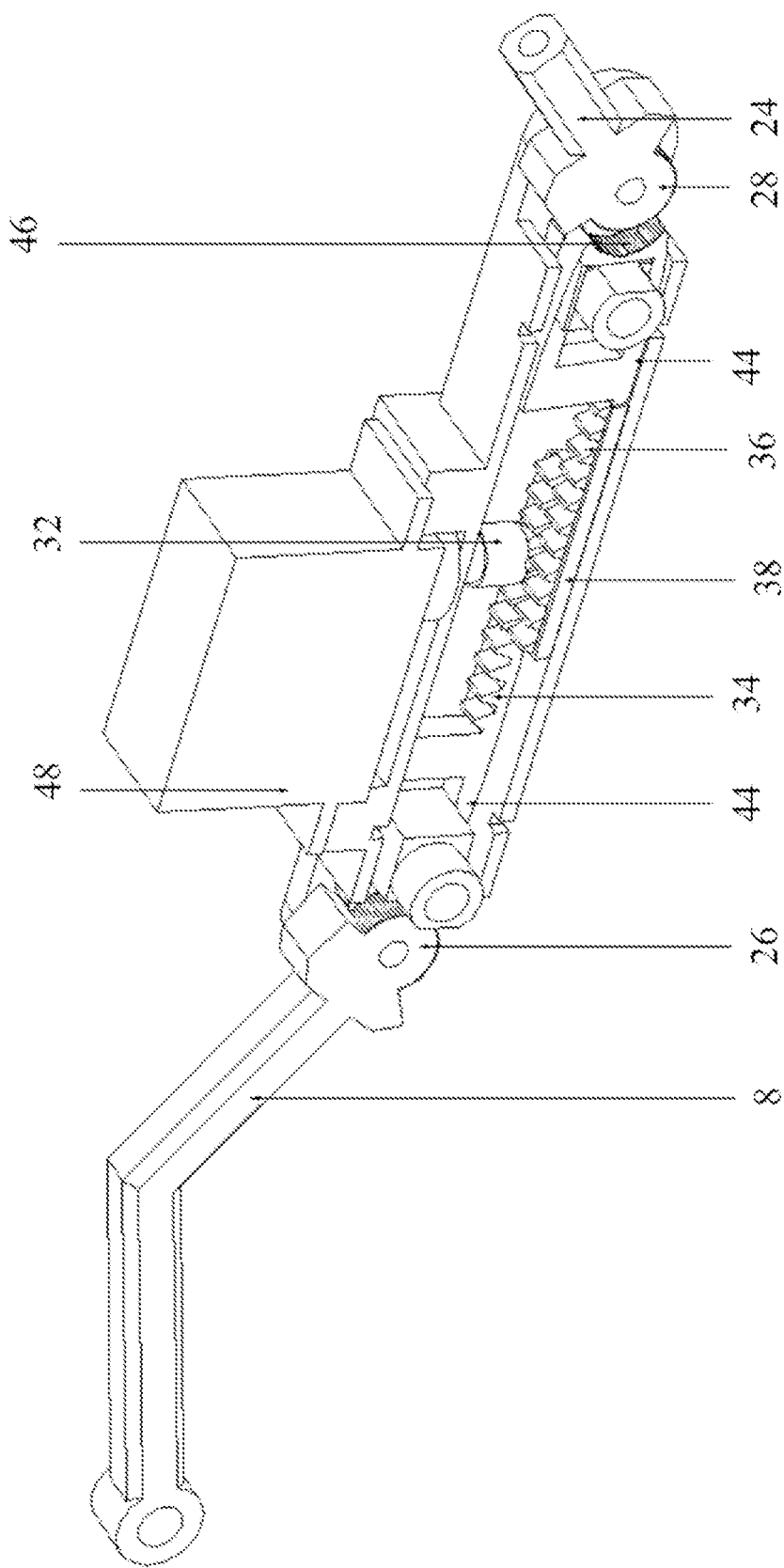
FIG. 8 illustrates a cross-sectional perspective view of another locking mechanism, according to some embodiments.
Figure 9:
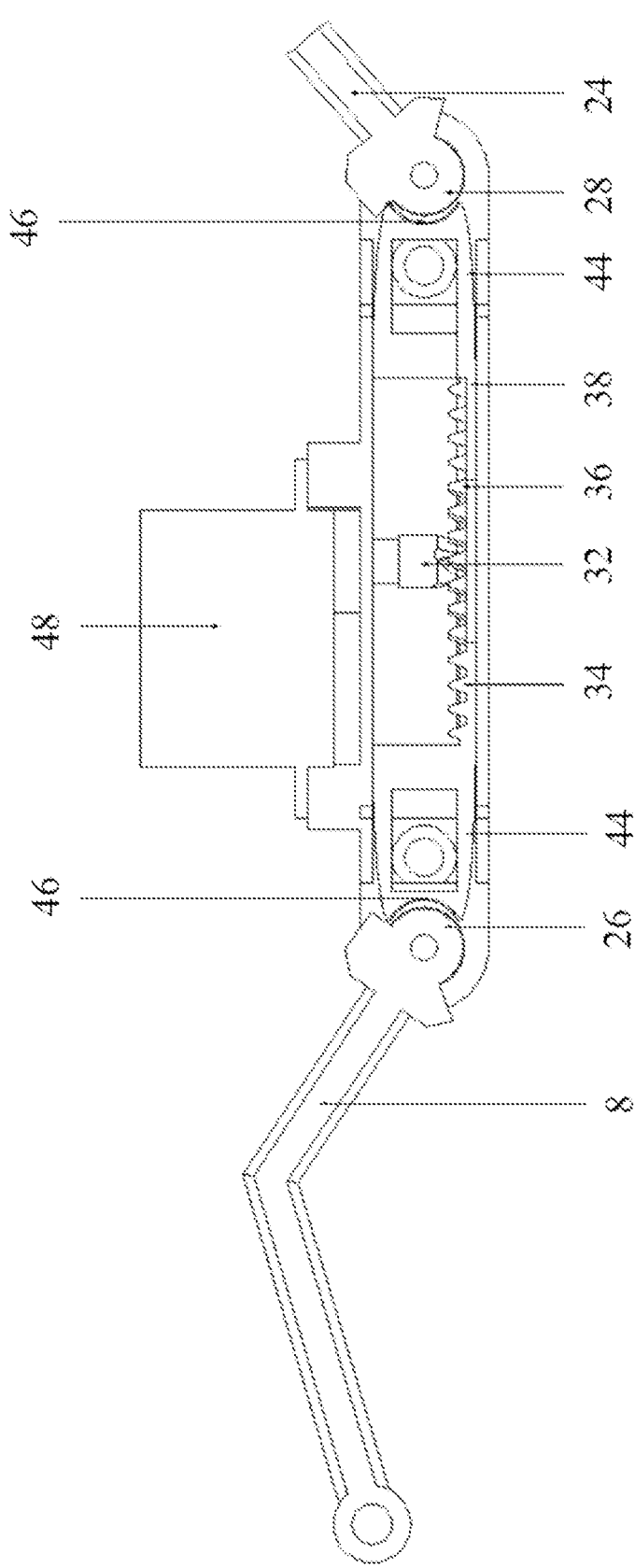
FIG. 9 illustrates a cross-sectional side view of the locking mechanism as shown in FIG. 8, according to some embodiments.

As shown in FIGS. 6 and 7, the link rods 18 may include five pairs of profiled link rods 8 and five straight rods 24. The four pairs of profiled link rods 8 and four straight rods 24 may be connected with the four-finger sensor module. The remaining pair that includes a profiled link rod 8 and one straight rod 24 may be connected with the thumb sensor module. Each pair of the profiled link rods 8 may be movably connected. As well, each pair may have a finger cap 16 on one side, and a first rotational joint 26 on the other side. One of the first rotational joints 26 may be coaxially connected with the seventh potentiometer 54. Furthermore, each of the other four first rotational joints 26 may be in coaxial connection with a third potentiometer 22.

Each straight rod 24 may have a second rotational joint 28 on one side. One of the second rotational joints 28 may be coaxially connected with the sixth potentiometer 52. The other four second rotational joints 28 may be coaxially connected with the first potentiometers 10. Furthermore, each of the straight rods 24 connected with the sixth potentiometers 52 may be connected with one of the fifth potentiometers 50 on the other end. The straight rod 24 connected with the first potentiometers 10 may also be connected with the second potentiometer on the other end.

The four-finger force feedback system and the thumb force feedback system may have the same structure. As such, each may include a case 30, a transmission mechanism and a locking mechanism. The transmission mechanism and the locking mechanisms may be disposed inside the case 30. The case 30 of each of the four-finger force feedback systems may have one of the third potentiometer 22 and one of the first potentiometer 10 on its two ends. The case 30 of the thumb force feedback system may have the seventh potentiometer 54 and the sixth potentiometer 52 on its two ends.

Each of the first rotational joints 26 of the profiled link rods 8 that are connected with the four-finger force feedback system may be in a coaxial connection with a respective third potentiometer 22. The first rotational joint 26 can be in a position-lock with the locking system. As well, each of the second rotational joints 28 of the straight rods 24 connected with the four-finger force feedback system may be in coaxial connection with the first potentiometer 10. The second rotational joint 28 may position-lock with the locking system. In some embodiments, the locking mechanism is a ratchet wheel self-lock mechanism. In some embodiments, the locking mechanism is a resistance wheel self-lock mechanism.

The first rotational joint 26 of the profiled link rod 8 connected with the thumb force feedback system may be coaxially connected with the seventh potentiometer 54. The first rotational joint 26 can position-lock via the locking system. The second rotational joint 28 of the straight rod 24 connected with the thumb force feedback system may be coaxially connected with the sixth potentiometer 52. The second rotational rod may position-lock via the locking system.

It should be appreciated that the potentiometers described in this disclosure can be any type of potentiometer. For example, the potentiometers can be rotational potentiometers or optical encoders, magnetic encoders, etc. As illustrated in a simplified kinetic model, the structure of the thumb sensor module and four-finger sensor modules is shown in FIGS. 2 and 3, where each cylinder represents a rotational potentiometer. As shown in FIGS. 2 and 3, the 16 rotational potentiometers in the hand motion capture system can transform a rotational signal to an electrical signal. However, this is just one of many examples. It should be appreciated that other hand motion capture systems can have any number of rotational potentiometers greater than or less than 16 rotational potentiometers, for example 11, 21, or 26 potentiometers. Data can be collected from the rotational potentiometers by the microcontroller 6.

Because the thumb can have a different exoskeleton structure than the four-fingers (index, middle, ring and little), accordingly the thumb sensor module may consist of 4 potentiometers. Among them the fourth potentiometer 14, the fifth potentiometer 50 and the sixth potentiometer 52 can be perpendicular to each other, together forming the X, Y, and Z axes of a rectangular coordinate. It should be appreciated that the X, Y, and Z axes can be parallel to the first direction X, second direction Y, and third direction Z, respectively. Accordingly, the seventh potentiometer 54 and the sixth potentiometer 52 can be parallel and connected via the thumb force feedback system. The fourth potentiometer 14 can be attached to the back side of the base 4, and electrically connected to the microcontroller 6. The four-finger sensor modules may capture the motion of the other four fingers. The four-finger sensor modules and the thumb sensor module may be connected by the fourth potentiometer 14. Accordingly, all potentiometers may be connected to the microcontroller 6.

In the four-finger sensor module, the second potentiometer may be perpendicular to the first potentiometer 10. Accordingly, the first potentiometer 10 and the third potentiometer 22 may be parallel to each other and connected via the four-finger force feedback system. The four second potentiometers 12 may be attached to the base 4, and all aligned in the same direction. The four second potentiometers 12 may also be aligned in the same vertical plane perpendicular to the plane of the base 4, for example, the third direction Z. As well, the fourth potentiometer 14 may be attached to the backside of the base 4. Accordingly, the fourth potentiometers 14 can be lower than the other four second potentiometers 12, whereby its axis $Y_1$ intersects with the connection of the axes $Z_1$ of the four second potentiometers 12. Furthermore, the fourth potentiometer 14 may have an angle range from 0 to 30 degrees, which means the thumb base 4 has an angle range from 0 to 60 degrees relative to the four fingers, as illustrated in FIG. 3. The 0 to 60 degree deflection angle at the thumb base 4 joint may be ergonomically correct, which may allow the exoskeleton to match more closely with the thumb motions. This may allow the thumb to move more fluently to capture motions. As well, it may reduce any discomfort in wearing the device 2. The 0 to 60 degrees may not mean that the device 2 can rotate in this range, but that a certain angle may be selected from this range and fixed.

As shown in FIGS. 6 and 7, the transmission system may also include a profiled gear 32, as well as a first rack 34 and a second rack 36. The first rack 34 can be parallel with the second rack 36. Each of the first and second racks 34 and 36 may be movably connected with one of two slide tracks 38 disposed inside the case 30. The profiled gear 32 may be connected to the case 30, above the first rack 34. In this configuration, the profiled gear 32 may mesh with the first rack 34 and the second rack 36. The first rack 34 and the second rack 36 may slide in the slide track 38 under the drive of the profiled gear 32.

In addition, FIGS. 6 and 7 demonstrate one way that locking may be achieved. As illustrated, the locking mechanism may be a ratchet wheel self-locking mechanism. A spark 40 may be included on one end of the first rack 34 such that it is near the first rotational joint 26, and on the end of the second rack 36 that is close to the second rotational joint 28. A plurality of ratchets 42 may surround the outer surfaces of the first rotational joint 26 and the second rotational joint 28. Accordingly, the ratchets 42 may mesh with the spark 40.

FIGS. 6 and 7 demonstrate yet another way that locking may be achieved. As shown, the locking system may include a resistance wheel. In this manner, a resistance or friction brick 44 may be connected with an end of the second rack 36 that is close to the second rotational joint 28, and an end of the first rack 34 that is close to the first rotational joint 26. In some embodiments, each friction brick 44 has a U-shape slot 46, which has an opening pointing towards the two sides of the case 30. The curved frictional concave of the U-shape slot 46 matches the first rotational joint 26 and the second rotational joint 28. As well, there may be matching threads on the curved frictional concave surface, as well as the first and second rotational joints 28. In addition to matching threads, other materials may be added to the concave surface to increase resistance. For example, these materials may be rubber, other types of polymers, or the like. In some examples, the materials may be aluminum and plastic.

The transmission system may have a drive system 48. The drive system 48 may be disposed outside the case 30 and connected with the profiled gear 32. The drive system 48 may also be connected with the microcontroller 6. In some embodiments, the drive system 48 is a servo motor, a gear motor linear actuator, or a screw motor. In some embodiments, the microcontroller 6 is a Bluetooth module. As well, in some embodiments, the connection pieces are disposed on an outer surface of the base 4. The connection pieces may be nylon straps, metal rings, plastic rings, or the like. As well, the finger caps 16 may form movable connections with the profiled link rods 8 by connection bolts 20. In practice, a host computer decides whether the hand touches virtual objects. If it touches, the host computer sends a signal to the microcontroller 6, which drives the motor to lock the joints and obstructs the hand to crawl and bend, thus generating a sense of gripping for the user.

Figure 10:
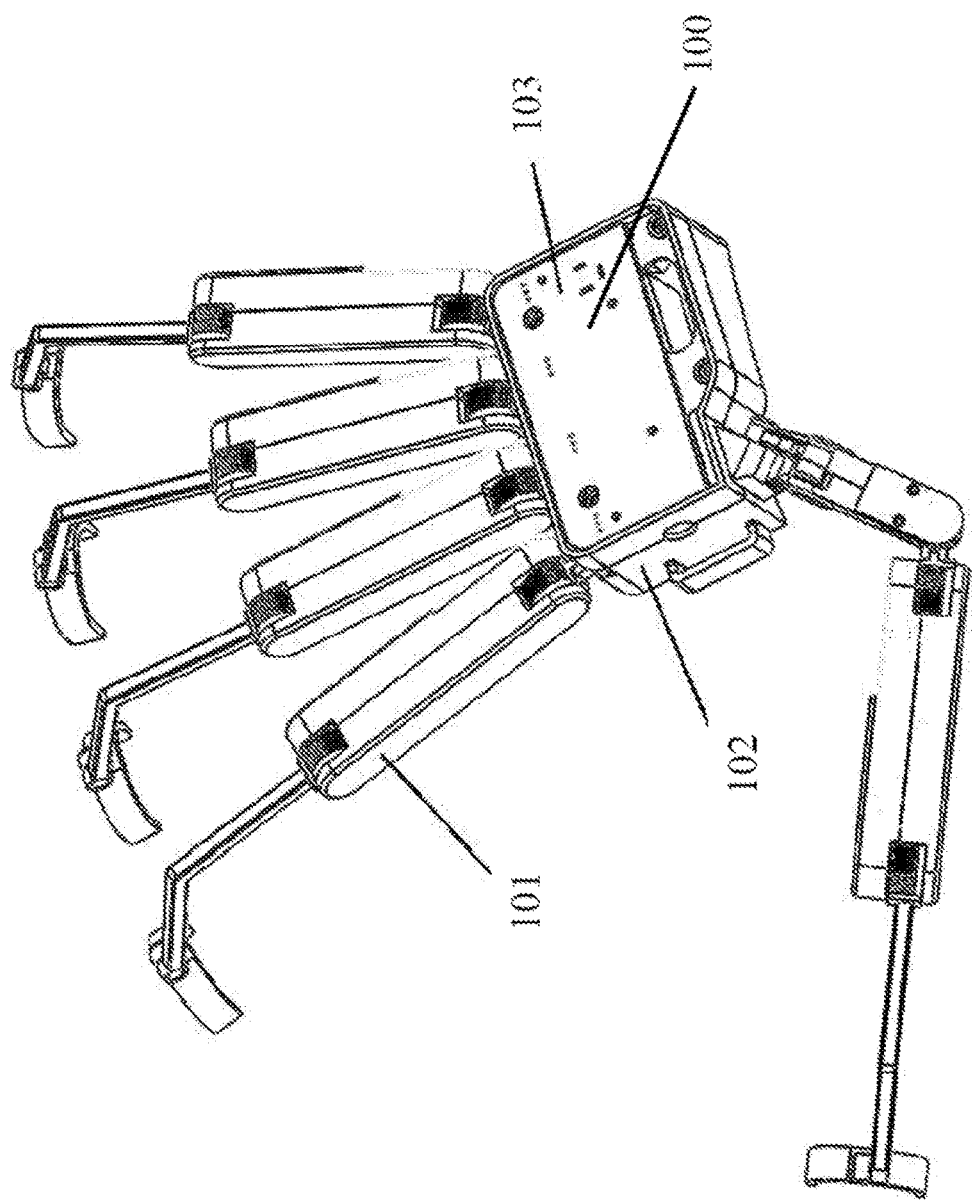
FIG. 10 illustrates a perspective view of a device using force-feedback, according to some embodiments.

With specific reference to FIG. 10, some embodiments of the device 101 may be installed on a hand-motion-capturing exoskeleton, thus enabling its force feedback abilities. The force feedback unit is mechanically connected to the base of the hand-motion-capturing exoskeleton 102 and electronically connected to the main microcontroller 103. In some embodiments, for each hand exoskeleton, five force feedback units are used to correspond to each of the five fingers of the hand. In some embodiments, for each hand exoskeleton, one force feedback unit is used to correspond to each of the five fingers of the hand.

Figure 11:
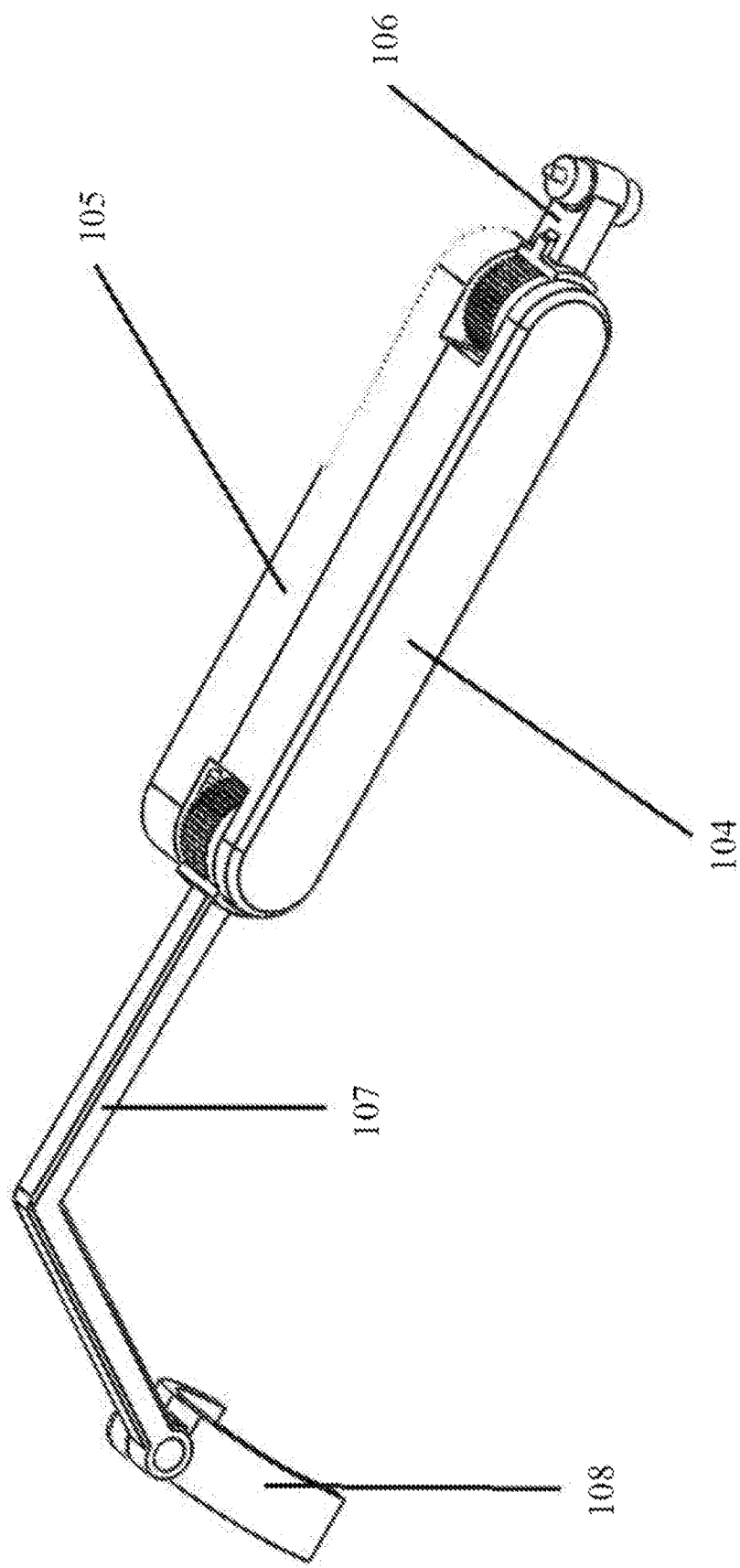
FIG. 11 illustrates a perspective view of a schematic of the force-feedback implementation of FIG. 10, according to some embodiments.
Figure 12:
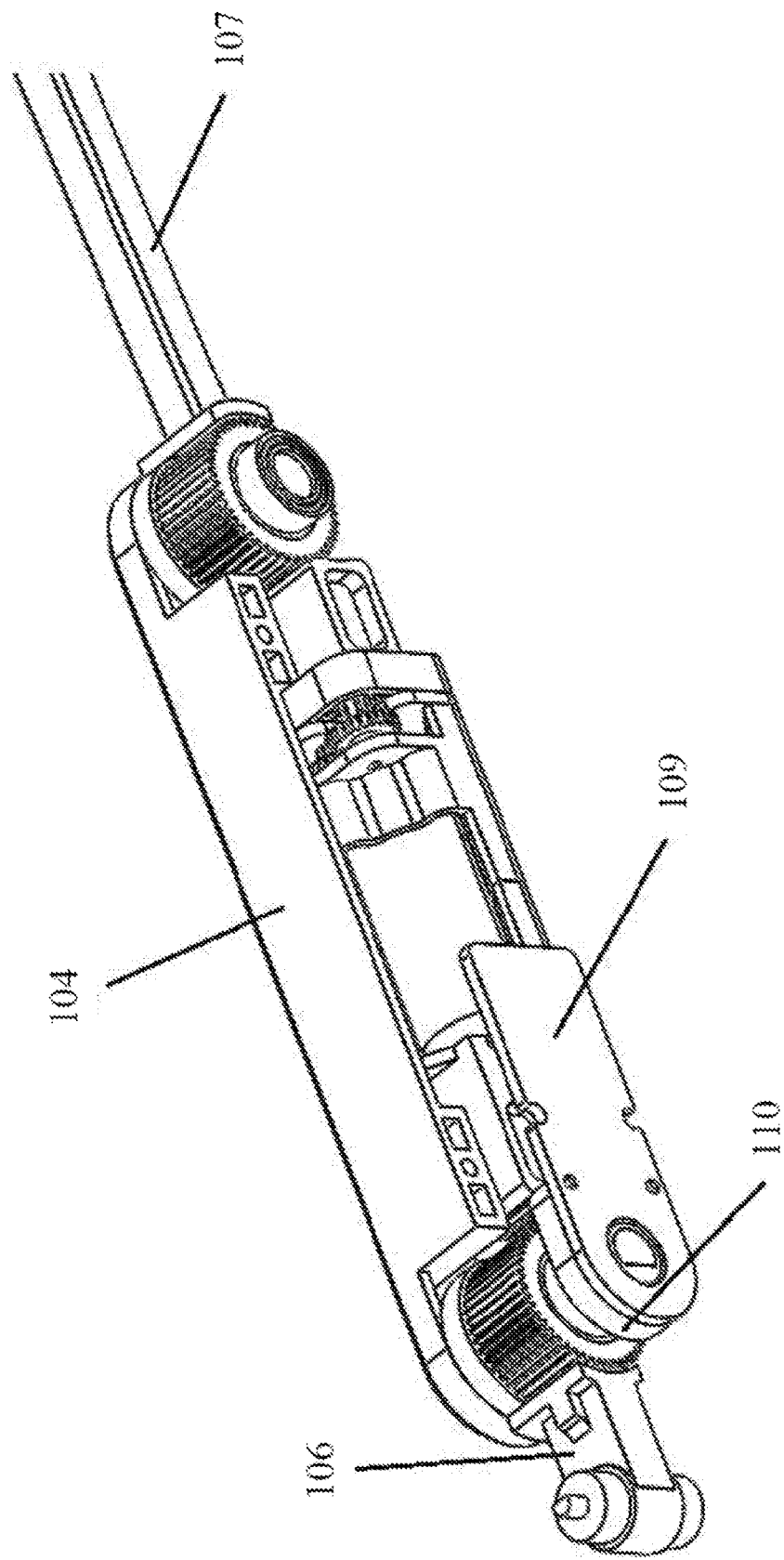
FIG. 12 illustrates a more detailed perspective view of a schematic of the force-feedback implementation from FIG. 11, according to some embodiments.

As shown in FIGS. 11 and 12, the force feedback unit is enclosed by the left half shell 105 and right half shell 104, and is mechanically linked to the base of the exoskeleton 102 via an upper link bar 106. On the other end the force feedback unit (the device) 101 is mechanically connected to the finger cap 108 via a profiled lower link bar 107. The finger cap 108 is connected directly to the users' fingertip, it thus transmits the force onto each fingertip. The device 101 includes a microcontroller 109, as well as a rotation sensor 110. When the force feedback module is not activated, the rotation sensor 110 reads the angle change and send it back to the main microcontroller 103 via the microcontroller 109. It should be appreciated that the rotation sensor can be, among other things a magnetic encoder, an optical encoder or simply a potentiometer. The data can be bidirectionally transmitted between the main microcontroller 103 and the on board micro controller 109 via a wire. The force feedback device may be configured to capture hand motion. The exoskeleton nay be a motion capturing device. The exoskeleton may be configured to interface with a motion capturing device, for example the exoskeleton may be configured to interface with a flex sensor based motion capturing device, a IMU based motion capturing device, etc.

Figure 13:
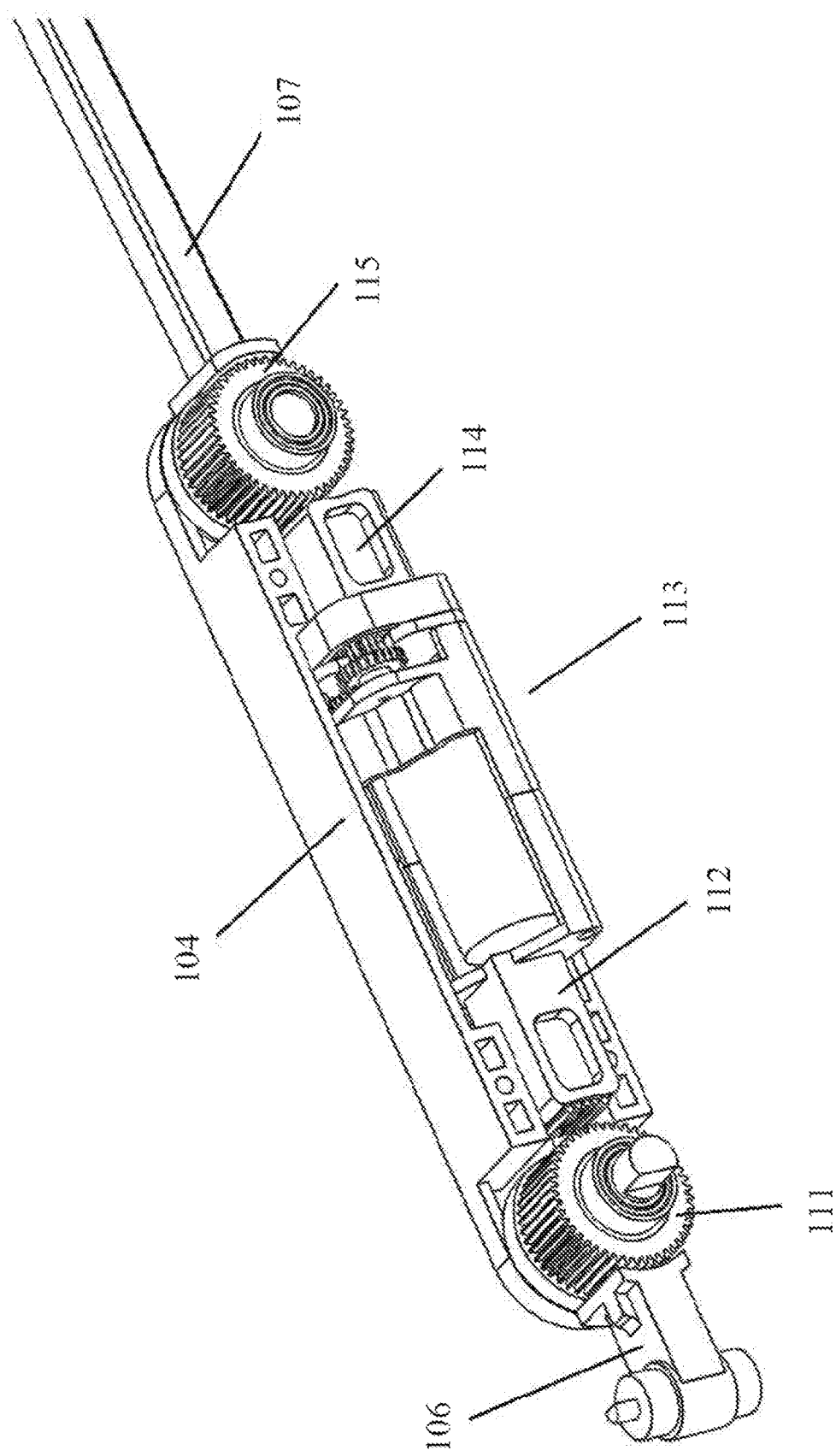
FIG. 13 illustrates a perspective view of a schematic of the transmission system from FIG. 12, according to some embodiments.
Figure 14:
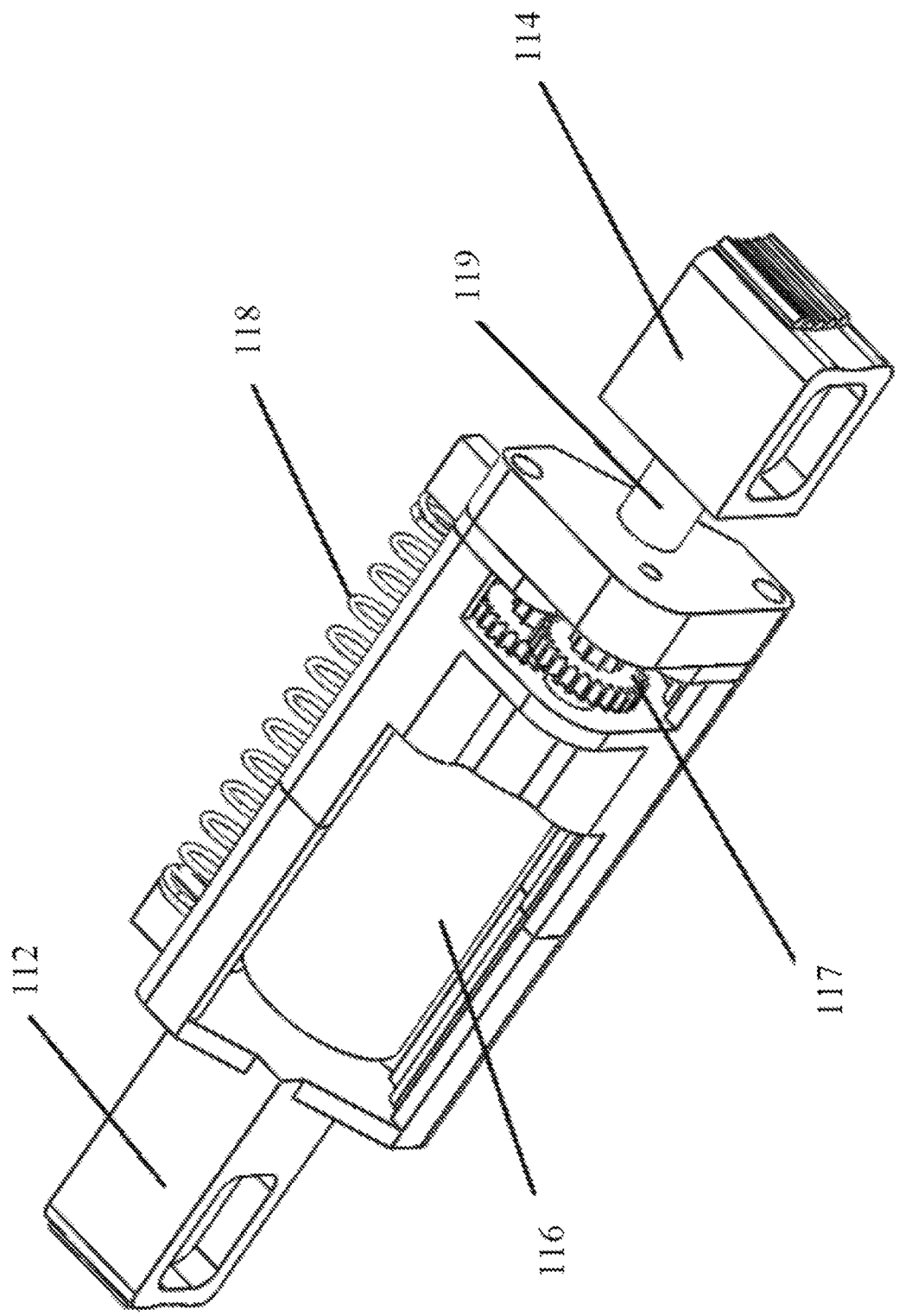
FIG. 14 illustrates a perspective view of a device using a force-feedback unit, according to some embodiments.
Figure 15:
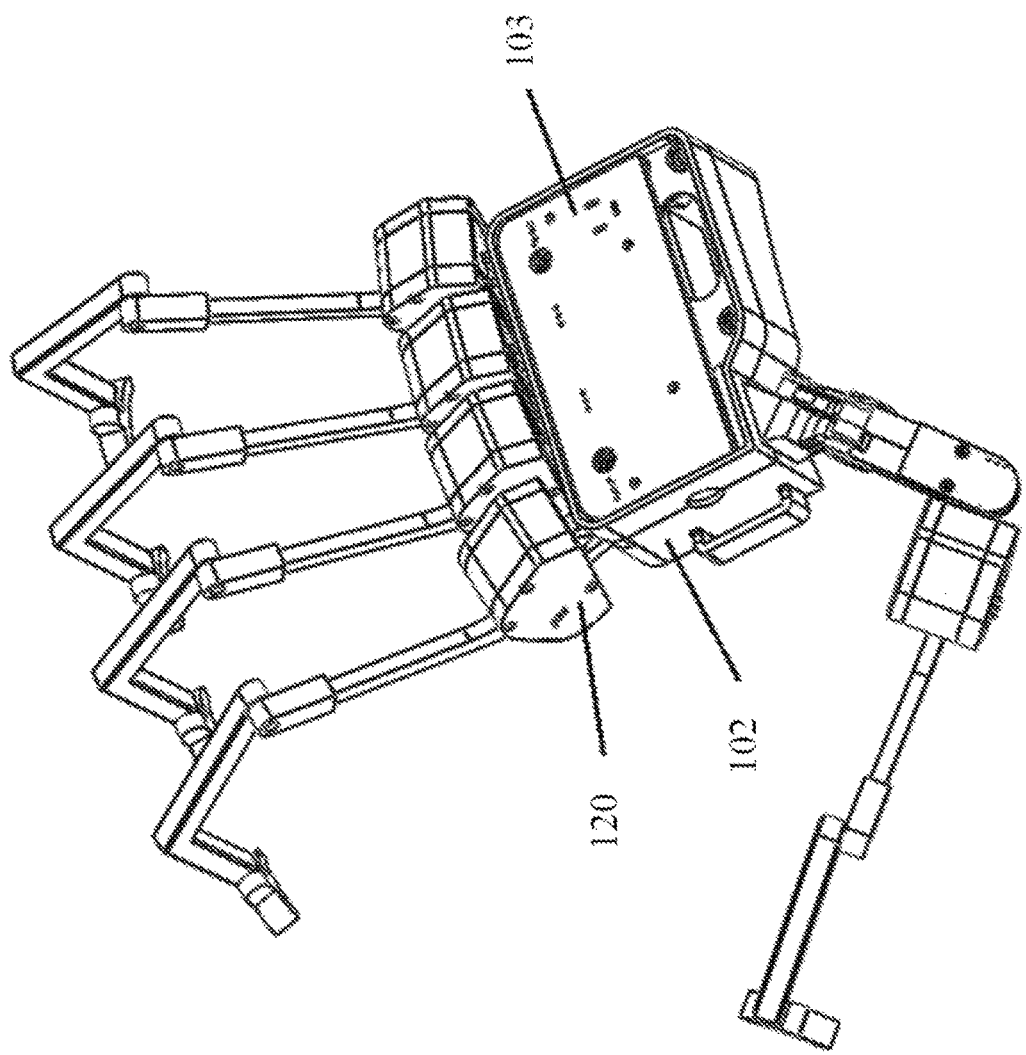
FIG. 15 illustrates a perspective view of a schematic of a force-feedback unit, according to some embodiments.

FIGS. 12, 13 and 14 demonstrate one way that force feedback could be achieved: via a side-locking mechanism. A profiled gear ring 111 is mechanically connected to the upper link bar 106. On the other end of the device, another profiled gear ring 115 is mechanically connected to the lower link bar 107. Gear ring 111 and gear ring 115 may be identical or may be unique. In the center of the device there is a linear actuator slider module 113. On the end closer to the upper ring gear 111, a profiled anti-shaped-gear 112 is fixed at the end of the linear actuator slider module 113. On the other end closer to the lower ring gear 115, a profiled anti-shaped-gear slider 114 may be movably connected with the linear actuator slider module 113 via a worm gear 119. The linear actuator slider module 113 itself is made up of a motor 116 and a transmission gear box 117. The gear ratio and gear configuration of the transmission gear box may be arbitrary. It should be appreciated that the linear actuator slider can be any kind of linear actuator, i.e. a linear solenoid, or a rotational solenoid with a worm gear, which may transform its rotational movement into linear movement.

When the device is activated and the force feedback mode is on, the motor 116 will start to run and via the transmission gear box 117, rotate the worm gear 119, and push the movable profiled anti-shaped-gear slider 114 along the direction of the linear actuator slider module 113. Once the profiled anti-shaped-gear slider 114 meshes with the lower ring gear 115, the rotation of the lower link bar 107 will be locked in place. The linear actuator slider module 113 will then slide backward along the same path because the linear actuator is still elongating. Next the profiled anti-shaped-gear fixed at the end will mesh with the upper ring gear 111. The microcontroller 109 reads the increase in motor current because of the stalling and then commands the motor 116 to stop running. At this point the force feedback unit fully locks both its joints, thus providing a rigid force feedback to the end finger cap 108. The unlocking process is just reversing the motor, and once the linear actuator slider module 113 shortens back to its original length, the spring 118 between the linear actuator slider module 113 and the left shell 104 will bring the linear actuator slider module 113 back to its original position thus restore free rotation mode for the end ring gears 111 and 115. It should be appreciated that for the gear box mentioned can be any back drivable combination of gears. For example, it can be a combination of two bevel gears when the motor is installed on the same plan with the torque output arm, or ball screws and flat gears. It should also be appreciated that the linear actuator can be any kind of linear actuator, i.e. a linear solenoid, or a rotational solenoid with a worm gear, which transform its rotational movement into linear movement.

FIGS. 15, 16, 17, 18, 19 demonstrate another way force feedback can be achieved: via a direct drive motor system. With specific reference to FIG. 15, some embodiments of the device 120 may be installed on a hand-motion-capturing exoskeleton, thus enabling its force feedback abilities. The force feedback unit 101 is mechanically connected to the base of the hand-motion-capturing exoskeleton 102 and electronically connected to the main microcontroller 103. In some embodiments, for each hand exoskeleton, five force feedback units may be used to correspond to the five fingers of the hand.

Figure 16:
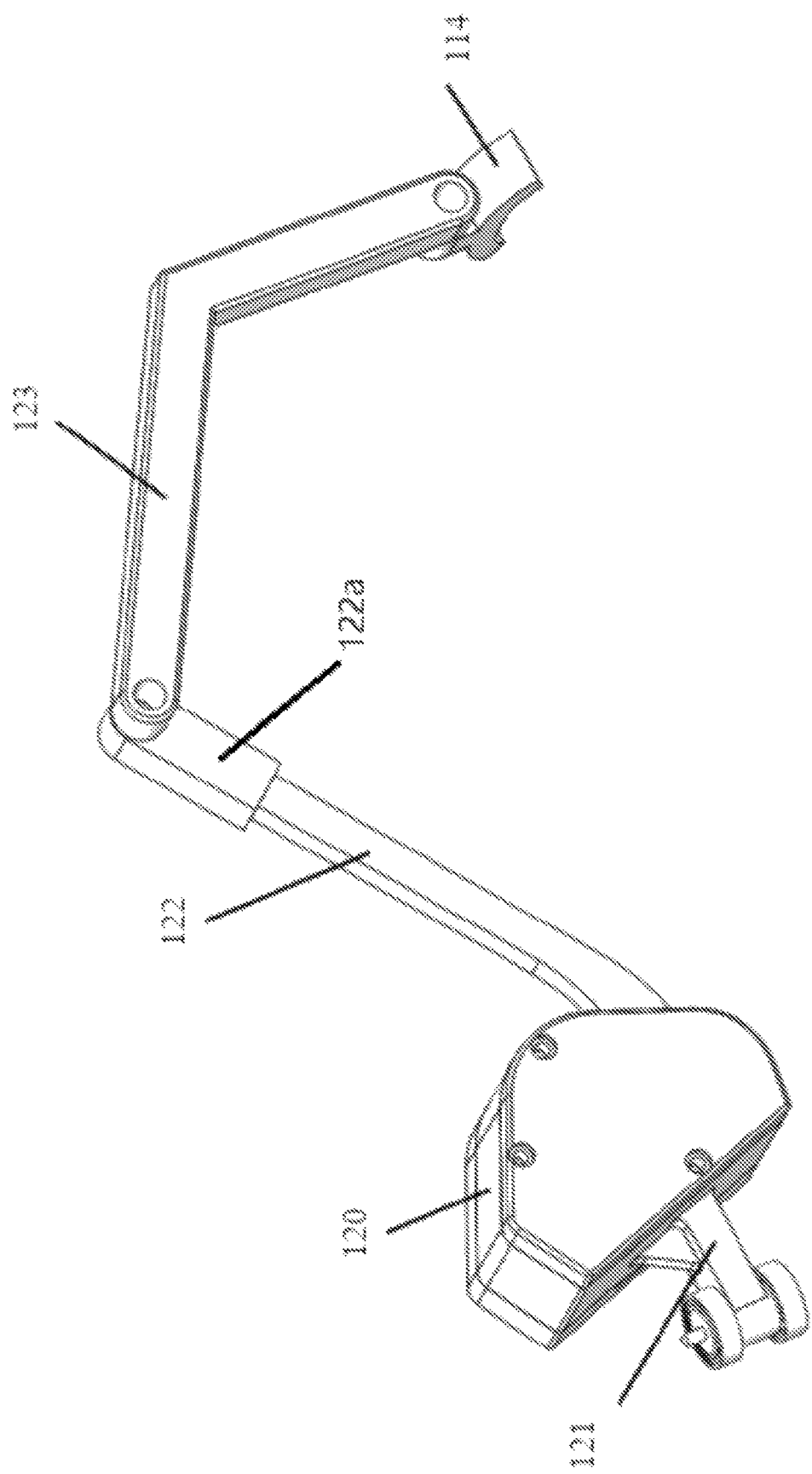
FIG. 16 illustrates another perspective view of a schematic of the transmission system from FIG. 15, according to some embodiments.

FIG. 16 demonstrates how the device 120 can be installed to a hand-motion-capturing device. The upper link bar 121 helps to mechanically connect the device 120 to the base 100 of the exoskeleton. The torque output arm 122 of the device 120 is jointed to a cap 122a, which is movably jointed to the profiled lower link bar 123. The profiled lower link bar 123 is then movably coupled to the finger cap 108 to transmit the torque output to the users' fingertips. It should be appreciated that the cap 122a and profiled lower link bar 123 may define different lengths and different shapes to fit with different finger lengths and user hand sizes.

Figure 17:
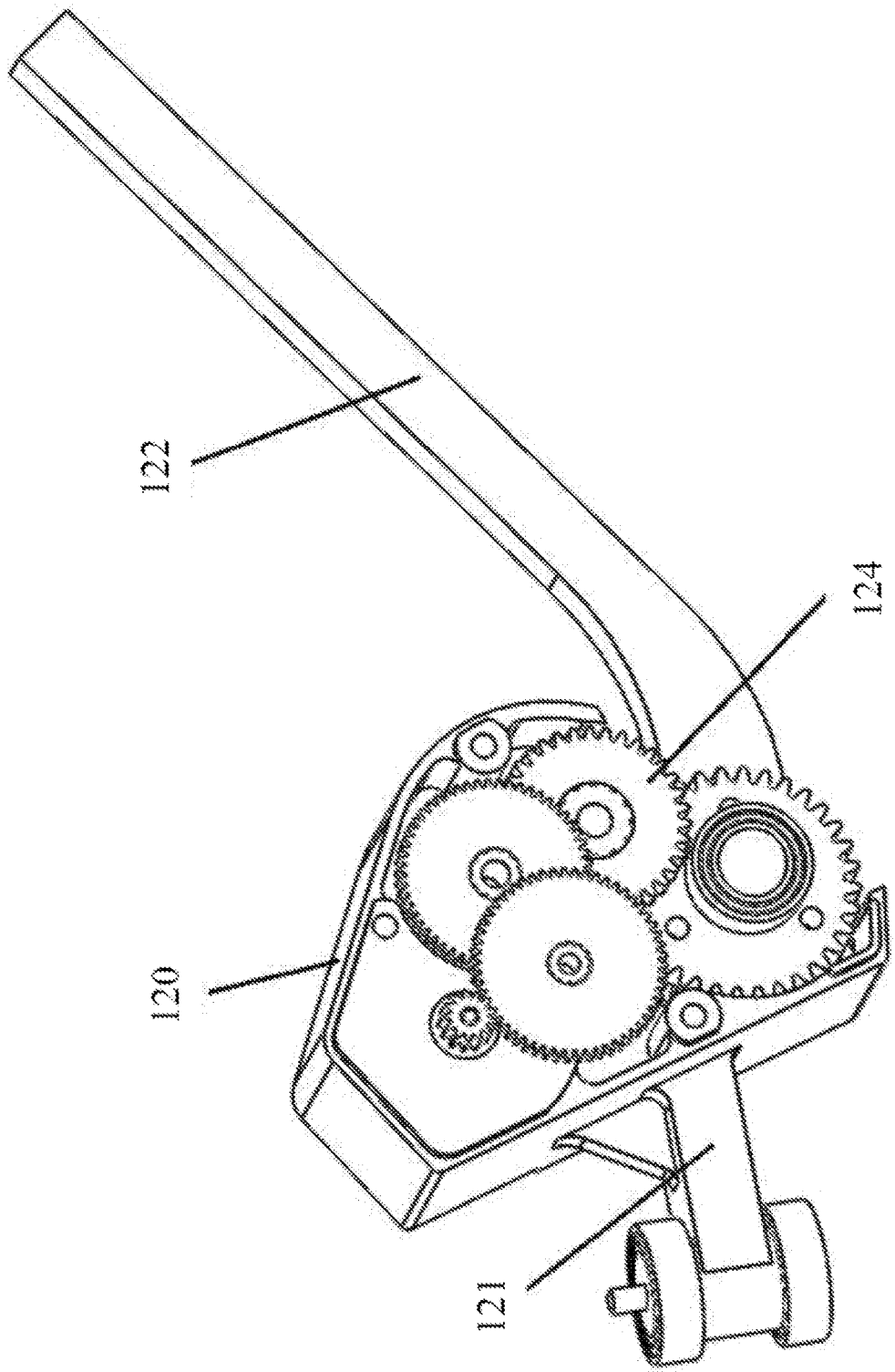
FIG. 17 illustrates another perspective view of a schematic of the electronic system from FIG. 16, according to some embodiments.
Figure 18:
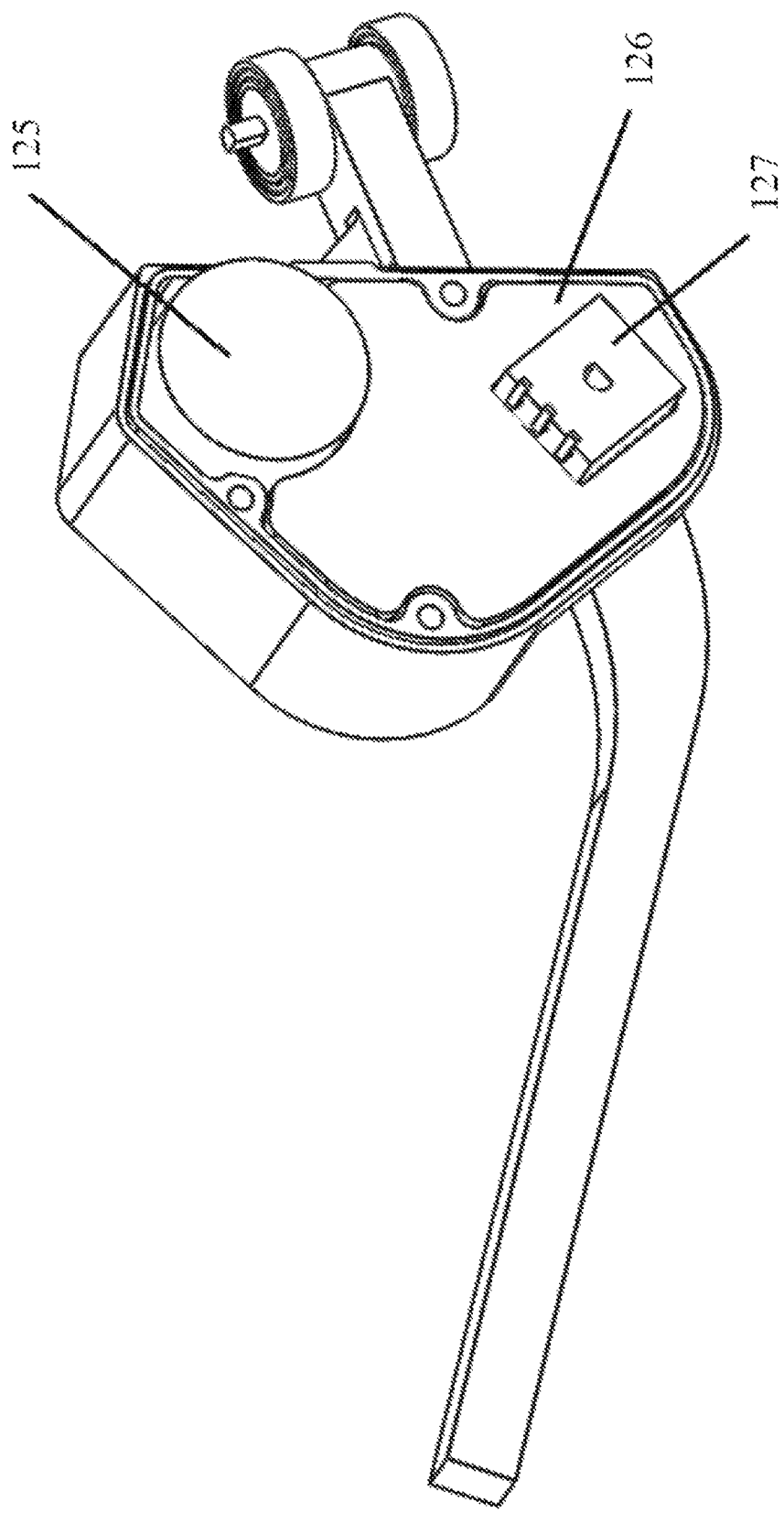
FIG. 18 illustrates another perspective view of a schematic of the electronic system from FIG. 17, according to some embodiments.

As shown in FIGS. 17 and 18, the device is consists of a motor 125, a transmission gear box 124, a torque output arm 122, a microcontroller 126 on it, and a rotation sensor 127. The microcontroller controls the motor rotation as well as the overall torque output, in other words the "stiffness output". When the force feedback module is not activated, the rotation sensor reads the angle change and send it back to the main microcontroller 103. When the force feedback module is activated, the on board microcontroller 126 will start to compute and regulate the torque output. It should be appreciated that the motor and transmission can be any type of motor system. In some embodiments, the transmission may include a level gear transmission. Depending on the position and orientation of the motor, bevel gears, the transmission may implement back-drivable worm gears to help to transmit the torque to the torque output arm. The motor may include a solenoid, or other actuators that can output torque.

Figure 19:
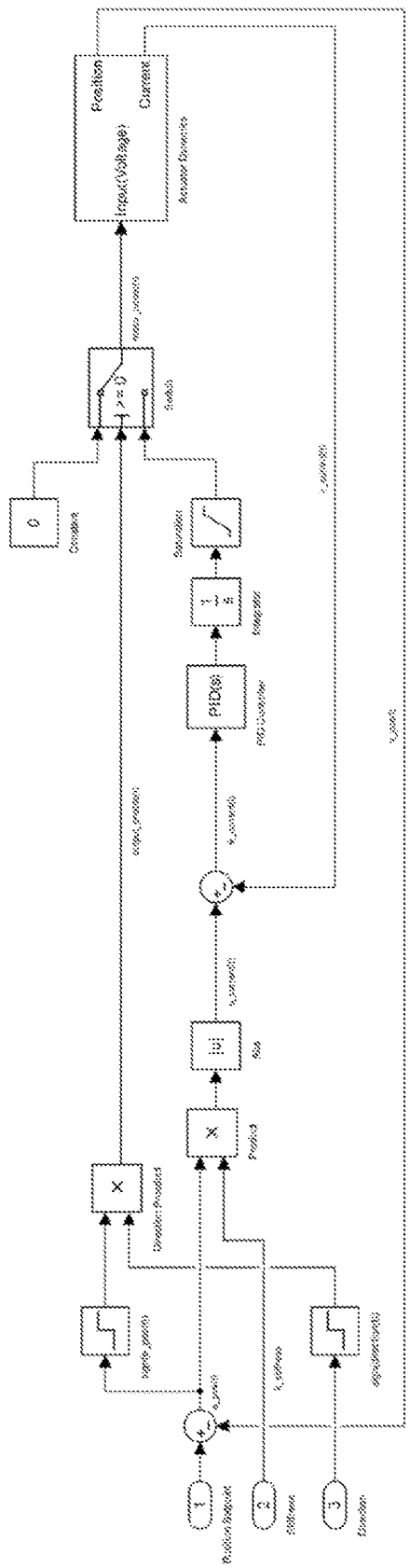
FIG. 19 is a schematic of a control process, according to some embodiments.

FIG. 19 shows the control process in detail. This device implements a motor control technique is called the "impedance control", turning a regular servo motor into an electronic spring, which stiffness can be electronically regulated. Some force feedback unit implementations may also provide computer-controlled resistance, to create different levels of springiness, which may effectively simulate the user feeling the object not existing in his or her presence. It achieves this by monitoring the current position of the torque output arm 122 as well as the current going through the motor 125. Based on the displacement of the torque output arm 122 comparing to the set point in the virtual world, an expected torque output can be calculated, and it may be multiplied by a stiffness constant to change the overall output. Because torque is proportional to current, and expected current can be calculated, in this way the microcontroller 126 performs a close loop control on the motor so the force feedback can be generated.

Figure 20:
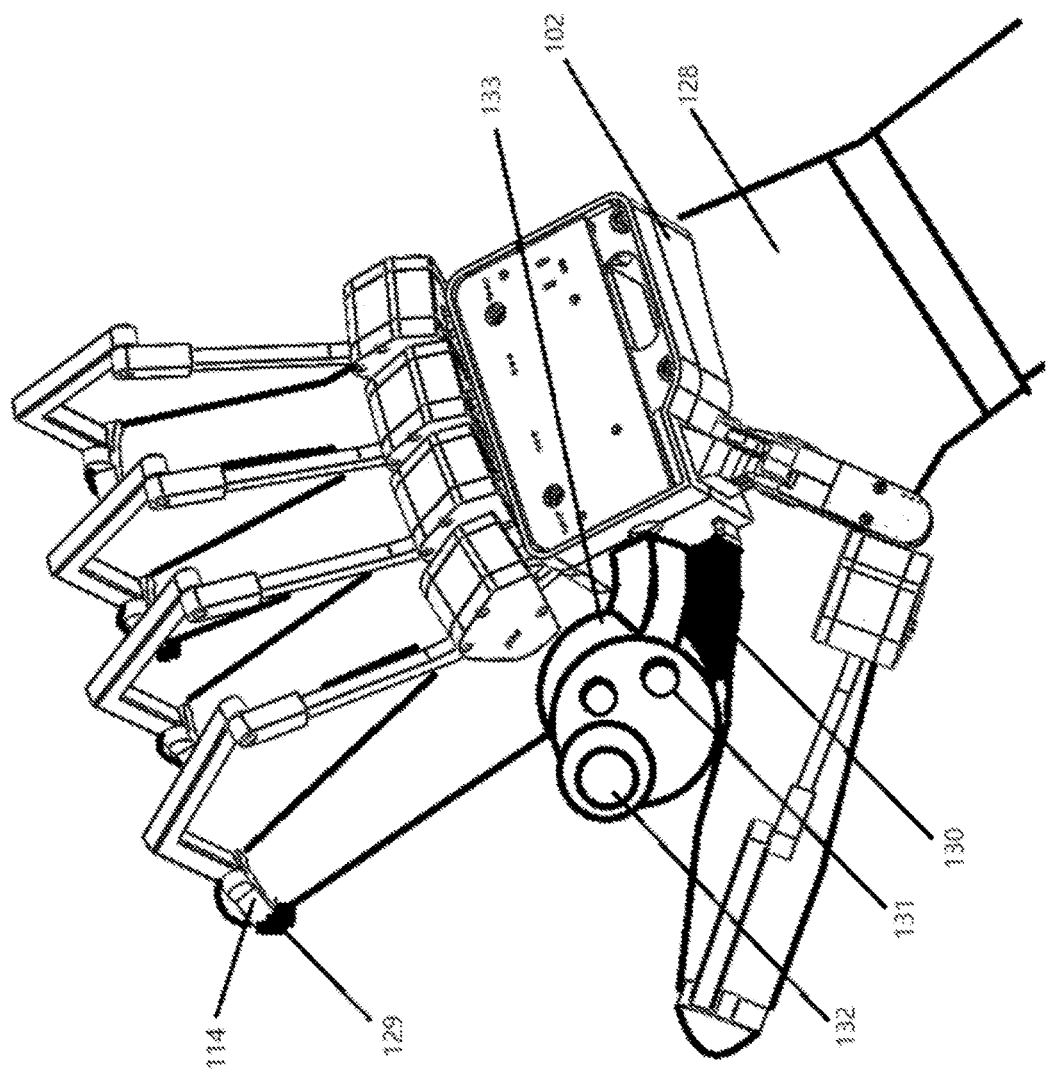
FIG. 20 illustrates a device equipped with the force feedback unit worn on a hand.

FIG. 20 shows how the motion capturing device equipped with the force feedback unit can be worn. The finger cap 114 is connected to the fingertip with a strip 129. The base 102 is fixed to the hand or to a glove with a palm strip 130. The device may be worn directly or may be worn on a glove 128, worn by the user. It should be appreciated that the finger cap 114 and base 102 can be fixed to the glove by means other than the strip, i.e. they can also be stitched directly to the glove. One or more buttons, dials or other user controls 131 and joystick 132 may or may not be attached to the base 102. FIG. 20 is for illustration purpose only. The positions of these attachments can be arbitrary. For example the illustration presents one or more buttons 131 and joystick 132 on an external piece 133 that is attached to the base 102. However these buttons 131 and joystick 132 can also be added to any location on the exoskeleton. It is appreciated that the joystick may provide input for orthogonal position input or angular rotational input.

Interpretation

For the purposes of this disclosure, the term "substantially" should be understood to mean for the most part or to a great or significant extent. As well, the terms "movable" or "movably" can also mean "unfixed" or "unfixedly," meaning that it is able to be moved and not fixed.

None of the steps or limitations described herein is essential or indispensable. Any of the steps or limitations can be adjusted or modified. Other or additional steps and/or limitations can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computer, processor, or machine configured to execute computer instructions. The code modules may be stored on any type of non-transitory computer-readable storage medium or tangible computer storage device, such as a hard drive solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

The invention claimed is:

1. A force feedback system, comprising:
 a base;
 a microcontroller coupled to the base and communicatively coupled to a computing device;
 a thumb force feedback unit mechanically coupled to the base and configured to rotate both side to side and up and down with respect to the base, the thumb force feedback unit being communicatively coupled to the microcontroller, the thumb force feedback unit configured to capture thumb motion and provide force feedback according to input from the computing device; and
 four finger force feedback units each mechanically coupled to the base and configured to rotate side to side with respect to the base, the four finger force feedback units being communicatively coupled to the microcontroller, each of the four finger force feedback units configured to capture finger motion and provide force feedback according to input from the computing device, wherein each of the four finger force feedback units is configured to rotate side to side with respect to the base and restricted from rotating up and down with respect to the base, wherein the thumb force feedback unit and the four finger force feedback units comprise a direct drive motor system configured to output variable force, and wherein the force feedback system is arranged and configured to couple to a backside of a human hand.

2. The force feedback system of claim 1, wherein the thumb force feedback unit comprises a thumb housing, a thumb rotational sensor, a thumb microcontroller, a thumb transmission gear box, a thumb motor, and a torque output arm, and the four finger force feedback units comprise four finger housings, four finger rotation sensors, four finger microcontrollers, four finger transmission gear boxes, four finger motors, and four torque output arms.

3. The force feedback system of claim 1, further comprising a thumb joint mechanically coupled to the base and the thumb force feedback unit such that the thumb joint is located between the thumb force feedback unit and the base, wherein the thumb joint is configured to rotate up and down with respect to the base and restricted from rotating side to side with respect to the base, wherein the thumb force feedback unit is configured to rotate side to side with respect to the thumb joint and restricted from rotating up and down with respect to the thumb joint.

4. The force feedback system of claim 1, further comprising:
a thumb torque output arm coupled to the thumb force feedback unit, wherein the thumb torque output arm is configured to rotate up and down with respect to the thumb force feedback unit and restricted from rotating side to side with respect to the thumb force feedback unit; and
four finger torque output arms coupled to each of the four finger force feedback units, wherein each of the four finger torque output arms are configured to rotate up and down with respect to each of the four finger force feedback units and restricted from rotating side to side with respect to each of the four finger force feedback units.

5. The force feedback system of claim 4, further comprising:
a thumb profiled link bar coupled to the thumb torque output arm, wherein the thumb profiled link bar is configured to rotate up and down with respect to the thumb torque output arm and restricted from rotating side to side with respect to the thumb torque output arm; and
four finger profiled link bars each coupled to the four finger torque output arms, wherein the four finger profiled link bars are each configured to rotate up and down with respect to the four finger torque output arms and restricted from rotating side to side with respect to the four finger torque output arms.

6. The force feedback system of claim 5, wherein the thumb profiled link bar is configured to slide with respect to the thumb torque output arm and restricted from rotating with respect to the thumb torque output arm, and wherein the four finger profiled link bars are each configured to slide with respect to the four finger torque output arms and restricted from rotating with respect to the four finger torque output arms.

7. The force feedback system of claim 5, further comprising:
a thumb finger cap coupled to the thumb profiled link bar, wherein the thumb finger cap is configured to rotate up and down with respect to the thumb profiled link bar and restricted from rotating side to side with respect to the thumb profiled link bar; and
four finger caps coupled to each of the four finger profiled link bars, wherein each of the four finger caps are configured to rotate up and down with respect to the four finger profiled link bars and restricted from rotating side to side with respect to the four finger profiled link bars.

8. The force feedback system of claim 7, further comprising:
a thumb strip coupled to the thumb finger cap, wherein the thumb strip is configured to wrap around a tip surface of a thumb finger; and
four finger strips coupled to each of the four finger caps, wherein the four finger strips are each configured to wrap around a tip surface of a finger.

9. The force feedback system of claim 2, wherein the thumb microcontroller and the four finger microcontrollers are configured to regulate torque output of the direct drive motor system.

10. The force feedback system of claim 1, wherein the direct drive motor system is a servo motor.

11. The force feedback system of claim 1, further comprising at least one of a button and a user control coupled to the base, wherein the button and the user control are configurable to receive input from a user.

12. The force feedback system of claim 1, wherein the thumb force feedback unit is communicatively coupled to the microcontroller via a wired connection.

13. The force feedback system of claim 1, wherein the four finger force feedback units are each communicatively coupled to the microcontroller via a wired connection.

14. The force feedback system of claim 1, wherein the microcontroller is communicatively coupled to the computing device via at least one of a wireless connection and a wired connection.

15. The force feedback system of claim 1, wherein the base comprises an exoskeleton arranged and configured to move with a human hand and capture motion of the human hand, and wherein the force feedback system is arranged and configured to allow the human hand to move freely when force feedback is not applied, and to autonomously influence motion of the human hand when force feedback is applied.

16. The force feedback system of claim 1, wherein the force feedback system is portable.

17. The force feedback system of claim 1, wherein the direct drive motor system is actively controlled to act as a virtual variable stiffness spring.

* * * * *